United States Patent
Iwanami

(10) Patent No.: US 11,295,736 B2
(45) Date of Patent: Apr. 5, 2022

(54) COMMUNICATION SYSTEM AND COMMUNICATION CONTROL METHOD

(71) Applicant: SONY CORPORATION, Tokyo (JP)

(72) Inventor: Hiroshi Iwanami, Tokyo (JP)

(73) Assignee: SONY CORPORATION, Tokyo (JP)

( * ) Notice: Subject to any disclaimer, the term of this patent is extended or adjusted under 35 U.S.C. 154(b) by 25 days.

(21) Appl. No.: 16/069,005

(22) PCT Filed: Oct. 27, 2016

(86) PCT No.: PCT/JP2016/081954
§ 371 (c)(1),
(2) Date: Jul. 10, 2018

(87) PCT Pub. No.: WO2017/130496
PCT Pub. Date: Aug. 3, 2017

(65) Prior Publication Data
US 2019/0027142 A1    Jan. 24, 2019

(30) Foreign Application Priority Data

Jan. 25, 2016  (JP) .............................. JP2016-011664

(51) Int. Cl.
*G10L 15/22*    (2006.01)
*H04L 67/01*    (2022.01)
(Continued)

(52) U.S. Cl.
CPC .............. *G10L 15/22* (2013.01); *G06F 3/167* (2013.01); *G06F 16/337* (2019.01);
(Continued)

(58) Field of Classification Search
CPC . G06F 16/3329; G06F 17/2785; G10L 15/26; G10L 15/1815
See application file for complete search history.

(56) References Cited

U.S. PATENT DOCUMENTS 9,659,301 B1 *  5/2017  Briggs .................... H04W 4/70
10,217,142 B1 *  2/2019  Chordia ............ G06Q 30/0282
(Continued)

FOREIGN PATENT DOCUMENTS

CN     104951077 A    9/2015
GN     103593054 A    2/2014
(Continued)

OTHER PUBLICATIONS

International Search Report and Written Opinion of PCT Application No. PCT/JP2016/081954, dated Jan. 17, 2017, 08 pages.
(Continued)

*Primary Examiner* — Mark Villena
(74) *Attorney, Agent, or Firm* — Chip Law Group

(57) ABSTRACT

[Object] To provide a communication system and a communication control method capable of obtaining reliable feedback from a user further naturally through a conversation with an agent without imposing a burden on the user. [Solution] The communication system includes: a communication unit configured to receive request information for requesting feedback on a specific experience of a user; an accumulation unit configured to accumulate the feedback received from a client terminal of the user via the communication unit; and a control unit configured to perform control such that a question for requesting the feedback on the specific experience of the user based on the request information is transmitted to the client terminal of the user at a timing according to context of the user, and feedback input by the user in response to the question output as speech of an agent via the client terminal is received.

16 Claims, 25 Drawing Sheets

(51) Int. Cl.
  *G06F 16/335*    (2019.01)
  *H04L 67/60*     (2022.01)
  *H04L 67/50*     (2022.01)
  *H04L 67/04*     (2022.01)
  *G06F 16/332*    (2019.01)
  *G06F 3/16*      (2006.01)
  *G10L 13/00*     (2006.01)
  *G06Q 30/02*     (2012.01)
  *G10L 15/18*     (2013.01)
  *G10L 15/30*     (2013.01)
  *G10L 25/63*     (2013.01)
  *H04L 67/10*     (2022.01)

(52) U.S. Cl.
  CPC ..... *G06F 16/3329* (2019.01); *G06Q 30/0203* (2013.01); *G10L 13/00* (2013.01); *G10L 15/1815* (2013.01); *G10L 15/30* (2013.01); *G10L 25/63* (2013.01); *H04L 67/04* (2013.01); *H04L 67/22* (2013.01); *H04L 67/32* (2013.01); *H04L 67/42* (2013.01); *G10L 2015/223* (2013.01); *G10L 2015/227* (2013.01); *H04L 67/10* (2013.01)

(56) References Cited

U.S. PATENT DOCUMENTS

| | | |
|---|---|---|
| 2005/0144000 A1 | 6/2005 | Yamasaki et al. |
| 2006/0122834 A1* | 6/2006 | Bennett .................. G10L 15/30 704/256 |
| 2006/0236241 A1 | 10/2006 | Harada et al. |
| 2012/0185544 A1* | 7/2012 | Chang .................. G06F 16/2465 709/206 |
| 2014/0143157 A1* | 5/2014 | Jeffs .................... H04M 3/5175 705/304 |
| 2014/0222512 A1* | 8/2014 | Pace .................. G06Q 30/0203 705/7.32 |
| 2014/0267651 A1* | 9/2014 | Wexler ................. G09B 21/006 348/62 |
| 2016/0180360 A1* | 6/2016 | Tietzen ............. G06Q 30/0203 705/7.32 |
| 2016/0266724 A1* | 9/2016 | Plumb-Larrick ... G06F 3/04847 |
| 2016/0300275 A1* | 10/2016 | Kapoor ............. G06Q 30/0282 |

FOREIGN PATENT DOCUMENTS

| | | |
|---|---|---|
| GN | 104392720 A | 3/2015 |
| GN | 104464733 A | 3/2015 |
| JP | 09-081632 A | 3/1997 |
| JP | 2001-215993 A | 8/2001 |
| JP | 2002-216026 A | 8/2002 |
| JP | 2005-190421 A | 7/2005 |
| JP | 2005-309604 A | 11/2005 |
| JP | 2005-339368 A | 12/2005 |
| WO | 2004/072883 A1 | 8/2004 |

OTHER PUBLICATIONS

Office Action for CN Patent Application No. 201680079320.8, dated Jul. 27, 2021, 10 pages of Office Action and 13 pages of English Translation.

* cited by examiner

FIG. 13

| AGENT ID | QUESTION SENTENCE | ADVERTISEMENT CONTENT | CONDITION, ETC. | PROBABILITY 0~1 |
|---|---|---|---|---|
| CHARACTER A | CHOCOLATE | CHOCOLATE NEWLY RELEASED BY BB COMPANY IS DELICIOUS BECAUSE MILK IS CONTAINED MUCH | USER IS 30 YEARS OLD OR LESS | 0.5 |
| CHARACTER A, PERSON B | I WANT TO EAT SOME DELICIOUS FOOD | I HEARD THAT GRILLED MEAT AT CC STORE IS DELICIOUS | YEAR-END PARTY SEASON (DEC.) | 0.5 |
| ALL | I'M THIRSTY | AA WATER (BRAND NAME) IS GOOD FOR THIRST | — | 0.1 |

FIG. 16

| NUMBER | Mission | TIME LIMIT |
|---|---|---|
| 1 | OBTAINING FEEDBACK ON CHOCOLATE SAMPLE OF BB COMPANY | JAN. 14, 20XX |
| 2 | OBTAINING FEEDBACK OF RAMEN SAMPLE OF DD COMPANY | JAN, 30, 20XX |
| 3 | ASKING HOW DO YOU LIKE △△ APARTMENT HE/SHE MOVED INTO | FEB. 28, 200XX |
| 4 | ..... | ..... |

FIG. 17

| NUMBER | Mission | TIME LIMIT | EXPERIENCE DATE |
|---|---|---|---|
| 1 | OBTAINING FEEDBACK OF CHOCOLATE SAMPLE OF BB COMPANY | JAN. 14, 20XX | COMPLETED ON JAN. 2, 20XX |
| ... | ..... | ..... | ..... |

FIG. 22

| No. | SITUATION OR FEELING OF USER | INDEX |
|---|---|---|
| 1 | PERIOD OF TIME IN WHICH THERE IS SCHEDULE OF USER | −5 |
| 2 | PERIOD OF TIME IN WHICH THERE IS NO SCHEDULE OF USER | +3 |
| 3 | CONTEXT OF CONVERSION IS RELATED TO FEEDBACK TARGET | +4 |
| 4 | CONTEXT OF CONVERSATION IS NOT RELATED TO FEEDBACK TARGET | −3 |
| 5 | FEELING OF USER INDICATES EXCITED STATE | −5 |
| 6 | SITUATION IN WHICH FEELING OF USER IS CALM | +4 |
| 7 | USER IS BUSY | −3 |
| 8 | USER APPEARS TO HAVE FREE TIME | +2 |
| ... | ... | ... |

FIG. 24

| Mission | RELIABILITY: LOW (VERY FORMAL EXPRESSION) | RELIABILITY: INTERMEDIATE (VERY FORMAL EXPRESSION) | RELIABILITY: HIGH (CASUAL EXPRESSION) |
|---|---|---|---|
| OBTAINING FEEDBACK OF CHOCOLATE SAMPLE OF BB COMPANY | "COULD YOU PLEASE GIVE ME YOUR FEEDBACK ON THE CHOCOLATE?" | "CAN YOU GIVE ME YOUR FEEDBACK ON THE CHOCOLATE?" | "HOW WAS THE CHOCOLATE?" |
|  | ... | ... | (IN RESPONSE TO ANSWER OF USER "IT IS GOOD") "WHAT DO YOU LIKE ABOUT IT?" |
| ... |  |  | ... |

FIG. 26

| Mission | SALES POINT |
|---|---|
| OBTAINING FEEDBACK ON CHOCOLATE SAMPLE OF BB COMPANY | (1) SMOOTH MELT-IN-THE-MOUTH FEELING<br>(2) POLYPHENOL CONTENT OF ○○%, GOOD FOR HEALTH<br>(3) LOW IN CALORIES |
| ASKING HOW DO YOU LIKE △△ APARTMENT HE/SHE MOVED INTO | (1) QUIET RESIDENTIAL AREA<br>(2) SUFFICIENT SUNSHINE<br>(3) 3 MINUTES TO STATION |
| ... | ... |

FIG. 28

| Mission | SALES POINT | QUESTION SENTENCE DATA | FEEDBACK | USER STATE | POSITIVE DETERMINATION VALUE |
|---|---|---|---|---|---|
| OBTAINING FEEDBACK ON CHOCOLATE SAMPLE | (1) SMOOTH MELT-IN-THE-MOUTH FEELING | "I HEARD THAT THE CHOCOLATE PROVIDES GOOD MELT-IN-THE-MOUTH FEELING. HOW WAS IT?" | "IT SOFTLY MELTED, AND SO DELICIOUS" | SEEM TO BE PLEASED SMILE FACE | 0.75 |
| | (2) POLYPHENOL CONTENT OF ○○%, GOOD FOR HEALTH | "I HEARD THAT THE CHOCOLATE IS GOOD FOR HEALTH BECAUSE IT CONTAINS ○○% OF POLYPHENOL" | "HMM, I DON'T CARE AS LONG AS IT'S DELICIOUS" | SEEM TO SHOW ATTITUDE OF BOTHERSOME | 0.2 |
| | (3) LOW IN CALORIES | "I HEARD THAT THE CHOCOLATE IS LOW IN CALORIES." | "THAT'S GREAT" | SMILE FACE BODY LEANS FORWARD VOCABULARY AMOUNT IS ABRUPTLY INCREASED PITCH OF VOICE RISES | 0.9 |
| | ... | ... | ... | ... | ... |
| ... | | | | | |

COMMUNICATION SYSTEM AND COMMUNICATION CONTROL METHOD

CROSS REFERENCE TO RELATED APPLICATIONS

This application is a U.S. National Phase of International Patent Application No. PCT/JP2016/081954 filed on Oct. 27, 2016, which claims priority benefit of Japanese Patent Application No. JP 2016-011664 filed in the Japan Patent Office on Jan. 25, 2016. Each of the above-referenced applications is hereby incorporated herein by reference in its entirety.

TECHNICAL FIELD

The present disclosure relates to a communication system and a communication control method.

BACKGROUND ART

In recent years, with the development of communication technologies, messages have frequently been exchanged via networks. Users can use information processing terminals such as smartphones, mobile phone terminals, and tablet terminals to confirm messages transmitted from other terminals and transmit messages.

In addition, with information processing terminals, agent systems that perform automatic responses to messages of users have been proposed. With regard to such systems, for example, the following Patent Literature 1 discloses a device that realizes natural and smooth dialogue by generating a response for a user in consideration of a feeling of a user.

In addition, the following Patent Literature 2 discloses a system that is capable of displaying a character with a predetermined shape to have a conversation with a user and displays advertisement information in a form of introduction by the character.

In addition, the following Patent Literature 3 discloses a dialogue processing device that estimates a feeling of a user in accordance with voice prosodic information, conceptual information of a phrase subjected to voice recognition, a facial image, a pulse rate, and the like and generates an output sentence to be output to the user on the basis of an estimation result.

CITATION LIST

Patent Literature

Patent Literature 1: JP H9-81632A
Patent Literature 2: JP 2002-216026A
Patent Literature 3: JP 2001-215993A

DISCLOSURE I/F INVENTION

Technical Problem

Herein, it is very important to determine the impressions or opinions of the users and to connect the impressions and opinions to subsequent development of goods or improvement of services after users experience objects (goods and samples), content, agents, services, and the like.

However, it has been difficult to obtain feedback such as the impressions, opinions, and the like from the users and to arouse true feelings of the users naturally without imposing a burden on the users. For example, in the foregoing Patent Literature 2, advertisement information is displayed, but obtaining feedback on goods after actually purchasing the goods or the like is not considered.

Accordingly, the present disclosure proposes a communication system and a communication control method capable of obtaining reliable feedback from a user further naturally through a conversation with an agent without imposing a burden on the user.

Solution to Problem

According to the present disclosure, there is provided a communication system including: a communication unit configured to receive request information for requesting feedback on a specific experience of a user; an accumulation unit configured to accumulate the feedback received from a client terminal of the user via the communication unit; and a control unit configured to perform control such that a question for requesting the feedback on the specific experience of the user based on the request information is transmitted to the client terminal of the user at a timing according to context of the user, and feedback input by the user in response to the question output as speech of an agent via the client terminal is received.

According to the present disclosure, there is provided a communication control method including: by a processor, receiving request information for requesting feedback on a specific experience of a user via a communication unit; performing control such that a question for requesting the feedback on the specific experience of the user based on the request information is transmitted to a client terminal of the user at a timing according to context of the user, and feedback input by the user in response to the question output as speech of an agent via the client terminal is received; and accumulating the feedback received from the client terminal of the user via the communication unit, in the accumulation unit.

Advantageous Effects of Invention

According to the present disclosure, as described above, it is possible to obtain reliable feedback from a user further naturally through a conversation with an agent without imposing a burden on the user.

Note that the effects described above are not necessarily limitative. With or in the place of the above effects, there may be achieved any one of the effects described in this specification or other effects that may be grasped from this specification.

BRIEF DESCRIPTION I/F DRAWINGS

FIG. 13 is a diagram illustrating an example of advertisement information registered in an advertisement DB according to the embodiment.

FIG. 16 is a diagram illustrating an example of a mission list registered in a mission list DB according to the embodiment.

FIG. 17 is a diagram illustrating an example of an experience list registered in an experience list DB according to the embodiment.

FIG. 22 is a diagram illustrating an example of a timing index according to the embodiment.

FIG. 24 is a diagram illustrating an example of question sentence data adjusted in accordance with the reliability according to the embodiment.

FIG. 26 is a diagram illustrating an example of a sales point list of a mission according to the embodiment.

FIG. 28 is a diagram illustrating an example of a result generated through the result generation process according to the embodiment.

MODE(S) FOR CARRYING OUT THE INVENTION

Figure 1:
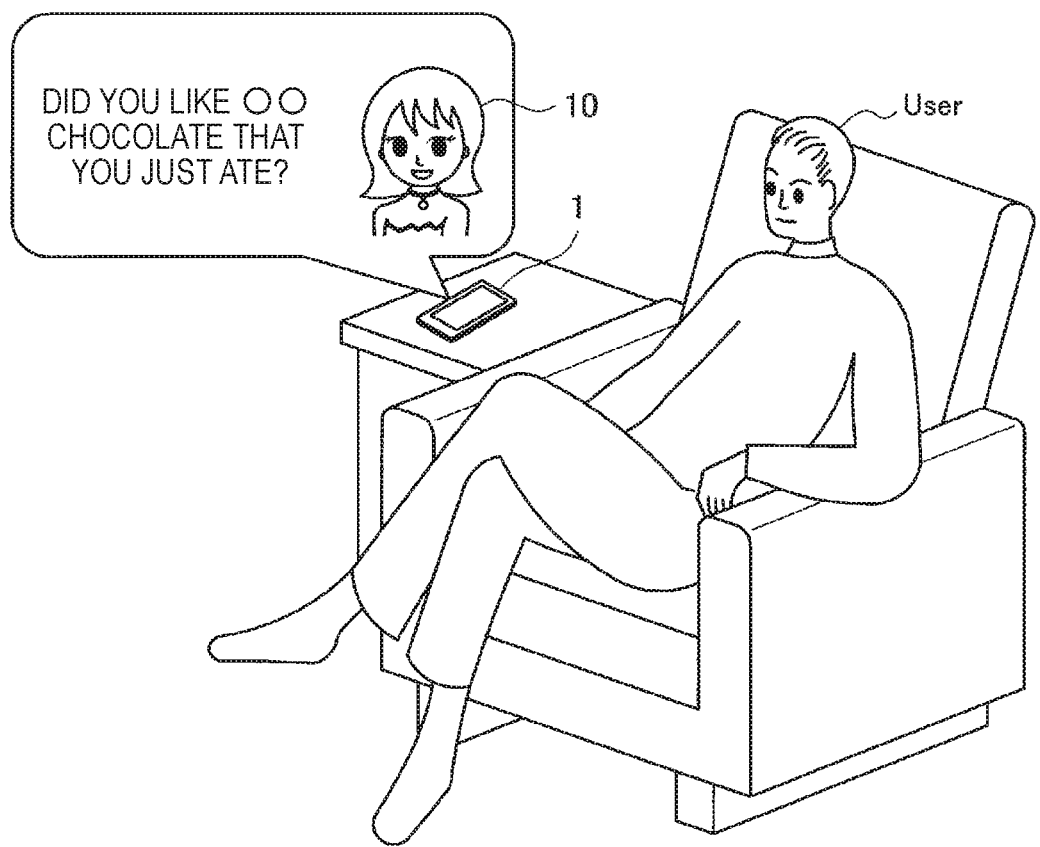
FIG. 1 is an explanatory diagram illustrating an overview of a communication control system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, the description will be made in the following order.

1. Overview of communication control system according to embodiment of the present disclosure
2. Configuration
2-1. System configuration
2-2. Server configuration
3. System operation process
3-1. Conversation data registration process
3-2. Phoneme DB generation process
3-3. Dialogue control process
3-4. Conversation DB updating process
3-5. Advertisement insertion process
4. Feedback acquisition process
4-1. Configuration
4-2. Operation process
5. Conclusion

1. OVERVIEW OF COMMUNICATION CONTROL SYSTEM ACCORDING TO EMBODIMENT OF THE PRESENT DISCLOSURE

A communication control system according to an embodiment of the present disclosure is capable of obtaining reliable feedback on a specific experience from a user who has the specific experience further naturally through a conversation with an agent without imposing a burden on the user. Hereinafter, an overview of the communication control system according to the embodiment will be described with reference to FIG. 1.

FIG. 1 is an explanatory diagram illustrating the overview of the communication control system according to an embodiment of the present disclosure. A dialogue with an agent can be performed via, for example, a client terminal 1 such as a smartphone owned by a user. The client terminal 1 includes a microphone and a speaker, and thus is capable of performing a dialogue with the user by voice.

BACKGROUND

Herein, as described above, after users experience objects (goods and samples), content, agents, services, and the like, it is very important to determine the impressions or opinions of the users and to connect the impressions and opinions to subsequent development of goods or improvement of services. However, it has been difficult to arouse true feelings of the users further naturally from the users without imposing a burden on the users.

For example, in a method of supplying samples of goods to users and obtaining feedback on the samples, feedback can be obtained more reliably from the users with motivation for obtaining the samples of the goods cheaply. However, reliability of the feedback is low. That is, at a stage of actually inputting opinions or comments, the users may feel that input manipulations are troublesome in many cases. Thus, there is a concern that vague comments or unsubstantial comments will be input. In addition, it is also difficult for company sides that provide the samples to determine whether the users respond with their true opinions or give uninformative comments, and reliability is lacking.

Accordingly, according to the embodiment, a system (agent system) that realizes a dialogue between a user and an agent is used so that the agent can get feedback from a user naturally and discreetly. Thus, it is possible to obtain reliable feedback further naturally without imposing a burden such as that posed by an input manipulation on a user.

For example, as illustrated in FIG. 1, when a user is relaxed or at a timing at which the user is free, the user is asked a question by an agent 10 for getting feedback on an object (a sample or the like), content, or a service (for example, the agent system) experienced by the user. This question is reproduced through voice of the agent 10 from the speaker of the client terminal 1. At this time, an image of the agent 10 may be displayed on a display of the client terminal 1.

The agent 10 asks, for example, "Did you like OO chocolate that you just ate?" and asks the user to give feedback on "OO chocolate" (which is an example of goods). When the user answers the question from the agent 10 with "It was pretty good," "I didn't really like it," "It was good, but it's a little expensive," or the like, the client terminal 1 can collect speech of the user with the microphone and obtain the feedback of the user.

In this way, the feedback on the goods can be acquired naturally from the user in a manner in which the agent 10 speaks to the user in a dialogue. Since the user can speak to the agent 10 at an unexpected timing, there is a high possibility of the user giving his or her true opinion or impression. In addition, when a character of the agent 10 is suitable for preference of the user or the user is accustomed to the character of the agent 10, an increase in the possibility of the user giving his or her true feeling is expected. Further, since the user merely speaks his or her feeling or opinion in response to a question of the agent 10, the effort of accessing a specific web site or inputting a comment is reduced. In addition, the communication control system (agent system) according to the embodiment is not limited to a voice agent that performs a response by voice, and a text treatment agent that performs a response on a text basis may be used in the client terminal 1.

2. CONFIGURATION

<2-1. System Configuration>

Figure 2:
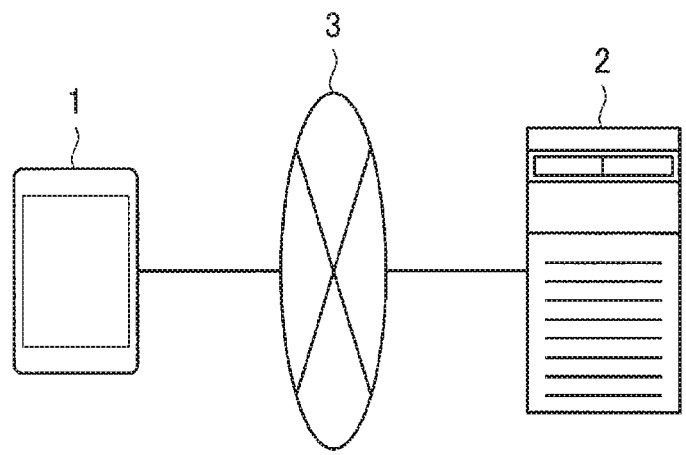
FIG. 2 is a diagram illustrating an overall configuration of the communication control system according to the embodiment.

Next, an overall configuration of the above-described communication control system according to the embodiment will be described with reference to FIG. 2. FIG. 2 is a diagram illustrating an overall configuration of the communication control system according to the embodiment.

As illustrated in FIG. 2, the communication control system according to the embodiment includes the client terminal 1 and an agent server 2.

The agent server 2 is connected to the client terminal 1 via a network 3 and transmits and receives data. Specifically, the agent server 2 generates response voice to spoken voice collected and transmitted by the client terminal 1 and transmits the response voice to the client terminal 1. The agent server 2 includes a phoneme database (DB) corresponding to one or more agents and can generate response voice through the voice of a specific agent. Herein, the agent may be a character of a cartoon, an animation, a game, a drama, or a movie, an entertainer, a celebrity, a historical person, or the like or may be, for example, an average person of each generation without specifying an individual. In addition, the agent may be an animal or a personified character. In addition, the agent may be a person in whom the personality of the user is reflected or a person in whom the personality of a friend, a family member, or an acquaintance of the user is reflected.

In addition, the agent server 2 can generate response content in which the personality of each agent is reflected.

The agent server 2 can supply various services such as management of a schedule of the user, transmission and reception of messages, and supply of information through dialogue with the user via the agent.

The client terminal 1 is not limited to the smartphone illustrated in FIG. 2. For example, a mobile phone terminal, a tablet terminal, a personal computer (PC), a game device, a wearable terminal (smart eyeglasses, a smart band, a smart watch, or a smart necklace) may also be used. In addition, the client terminal 1 may also be a robot.

The overview of the communication control system according to the embodiment has been described above. Next, a configuration of the agent server 2 of the communication control system according to the embodiment will be described specifically with reference to FIG. 3.

<2-2. Agent Server 2>

Figure 3:
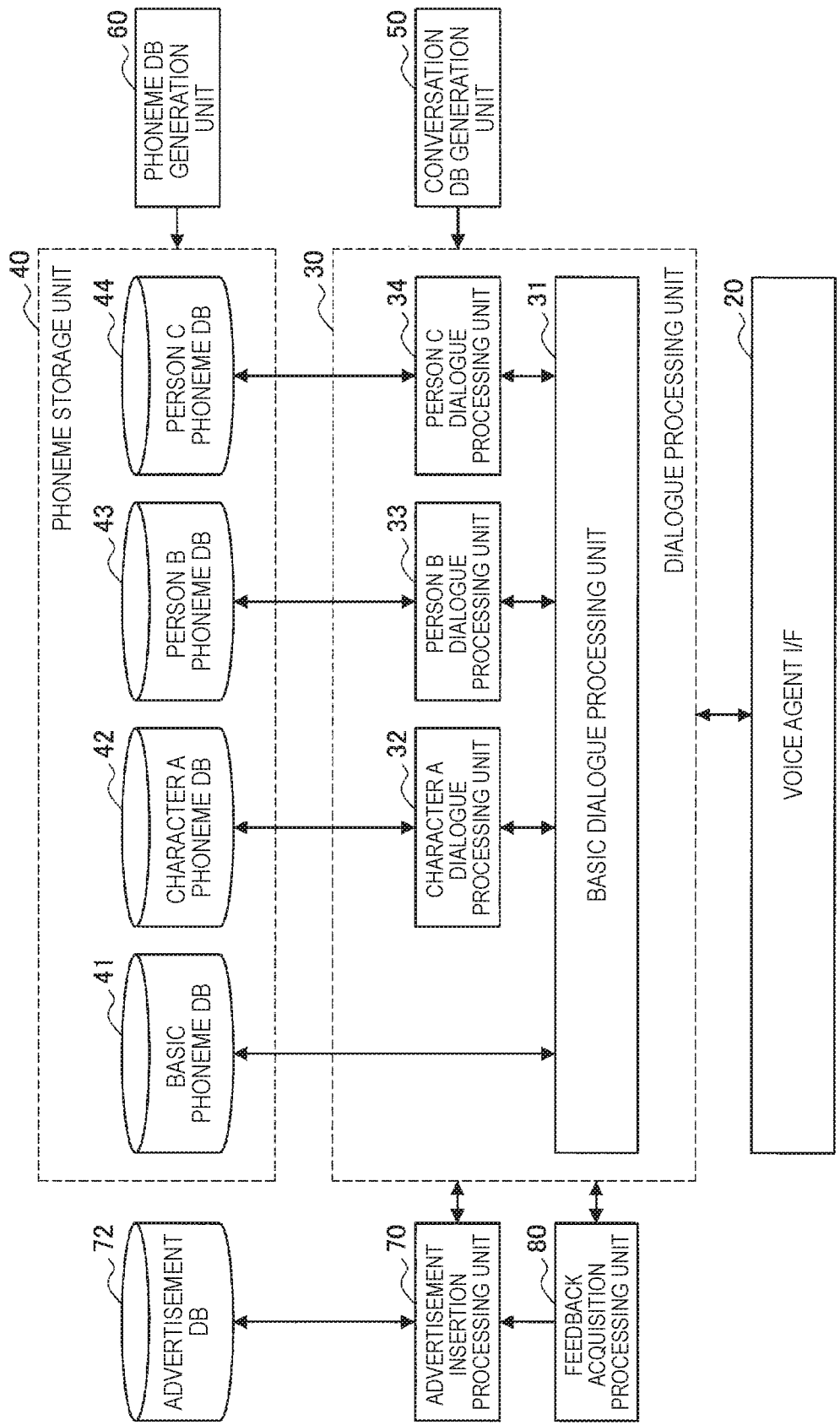
FIG. 3 is a block diagram illustrating an example of a configuration of a voice agent server according to the embodiment.

FIG. 3 is a block diagram illustrating an example of the configuration of the agent server 2 according to the embodiment. As illustrated in FIG. 3, the agent server 2 includes a voice agent interface (I/F) 20, a dialogue processing unit 30, a phoneme storage unit 40, a conversation DB generation unit 50, a phoneme DB generation unit 60, an advertisement insertion processing unit 70, an advertisement DB 72, and a feedback acquisition processing unit 80.

The voice agent I/F 20 functions as an input and output unit, a voice recognition unit, and a voice generation unit for voice data. As the input and output unit, a communication unit that transmits and receives data to and from the client terminal 1 via the network 3 is assumed. The voice agent I/F 20 can receive the spoken voice of the user from the client terminal 1, process the voice, and convert the spoken voice into text through voice recognition. In addition, the voice agent I/F 20 processes answer sentence data (text) of the agent output from the dialogue processing unit 30 to vocalize answer voice using phoneme data corresponding to the agent and transmits the generated answer voice of the agent to the client terminal 1.

The dialogue processing unit 30 functions as an arithmetic processing device and a control device and controls overall operations in the agent server 2 in accordance with various programs. The dialogue processing unit 30 is realized by, for example, an electronic circuit such as a central processing unit (CPU) or a microprocessor. In addition, the dialogue processing unit 30 according to the embodiment functions as a basic dialogue processing unit 31, a character A dialogue processing unit 32, a person B dialogue processing unit 33, and a person C dialogue processing unit 34.

The character A dialogue processing unit 32, the person B dialogue processing unit 33, and the person C dialogue processing unit 34 realize dialogue specialized for each agent. Herein, examples of the agent include a "character A," a "person B," and a "person C" and the embodiment is, of course, not limited thereto. Each dialogue processing unit realizing dialogue specialized for many agents may be further included. The basic dialogue processing unit 31 realizes general-purpose dialogue not specialized for each agent.

Herein, a basic configuration common to the basic dialogue processing unit 31, the character A dialogue processing unit 32, the person B dialogue processing unit 33, and the person C dialogue processing unit 34 will be described with reference to FIG. 4.

Figure 4:
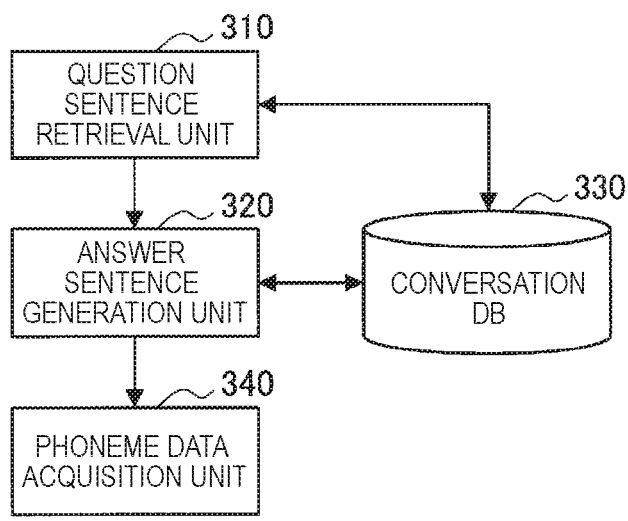
FIG. 4 is a diagram illustrating an example of a configuration of a dialogue processing unit according to the embodiment.

FIG. 4 is a diagram illustrating an example of a configuration of the dialogue processing unit 300 according to the embodiment. As illustrated in FIG. 4, the dialogue processing unit 300 includes a question sentence retrieval unit 310, an answer sentence generation unit 320, a phoneme data acquisition unit 340, and a conversation DB 330. The conversation DB 330 stores CONVERSATION data in which question sentence data and answer sentence data are paired. In the dialogue processing unit specialized for the agent, conversation data specialized for the agent is stored in the conversation DB 330. In a general-purpose dialogue processing unit, general-purpose data (that is, basic conversation data) not specific to the agent is stored in the conversation DB 330.

The question sentence retrieval unit 310 recognizes question voice (which is an example of spoken voice) of the user output from the voice agent I/F 20 and retrieves question sentence data matching the question sentence converted into text from the conversation DB 330. The answer sentence generation unit 320 extracts the answer sentence data stored in association with the question sentence data retrieved by the question sentence retrieval unit 310 from the conversation DB 330 and generates the answer sentence data. The phoneme data acquisition unit 340 acquires phoneme data for vocalizing an answer sentence generated by the answer sentence generation unit 320 from the phoneme storage unit 40 of the corresponding agent. For example, in the case of the character A dialogue processing unit 32, phoneme data for reproducing answer sentence data through the voice of the character A is acquired from the character A phoneme DB 42. Then, the dialogue processing unit 300 outputs the generated answer sentence data and the acquired phoneme data to the voice agent I/F 20.

The phoneme storage unit 40 stores a phoneme database for generating voice of each agent. The phoneme storage unit 40 can be realized by a read-only memory (ROM) and a random access memory (RAM). In the example illustrated in FIG. 3, a basic phoneme DB 41, a character A phoneme DB 42, a person B phoneme DB 43, and a person C phoneme DB 44 are stored. In each phoneme DB, for example, a phoneme segment and a prosodic model which is control information for the phoneme segment are stored as phoneme data.

The conversation DB generation unit 50 has a function of generating the conversation DB 330 of the dialogue processing unit 300. For example, the conversation DB generation unit 50 collects assumed question sentence data, collects answer sentence data corresponding to each question, and subsequently pairs and stores the question sentence data and the answer sentence data. Then, when a predetermined number of pieces of conversation data (pairs of question sentence data and answer sentence data: for example, 100 pairs) are collected, the conversation DB generation unit 50 registers the conversation data as a set of conversation data of the agent in the conversation DB 330.

The phoneme DB generation unit 60 has a function of generating the phoneme DB stored in the phoneme storage unit 40. For example, the phoneme DB generation unit 60 analyzes voice information of predetermined read text, decomposes the voice information into the phoneme segment and the prosodic model which is control information, and performs a process of registering a predetermined number or more of pieces of voice information as phoneme data in the phoneme DB when the predetermined number or more of pieces of voice information are collected.

The advertisement insertion processing unit 70 has a function of inserting advertisement information into dialogue of the agent. The advertisement information to be inserted can be extracted from the advertisement DB 72. In the advertisement DB 72, advertisement information (for example, information such as advertisement content of text, an image, voice, or the like, an advertiser, an advertisement period, and an advertisement target person) requested by a supply side such as a company (a vendor or a supplier) is registered.

The feedback acquisition processing unit 80 has a function of inserting a question for acquiring feedback into dialogue of the agent and obtaining the feedback from the user.

The configuration of the agent server 2 according to the embodiment has been described specifically above. Note that the configuration of the agent server 2 according to the embodiment is not limited to the example illustrated in FIG. 3. For example, each configuration of the agent server 2 may be achieved by another server on a network.

Next, a basic operation process of the communication control system according to the embodiment will be described with reference to FIGS. 5 to 14.

3. SYSTEM OPERATION PROCESS

<3-1. Conversation Data Registration Process>

Figure 5:
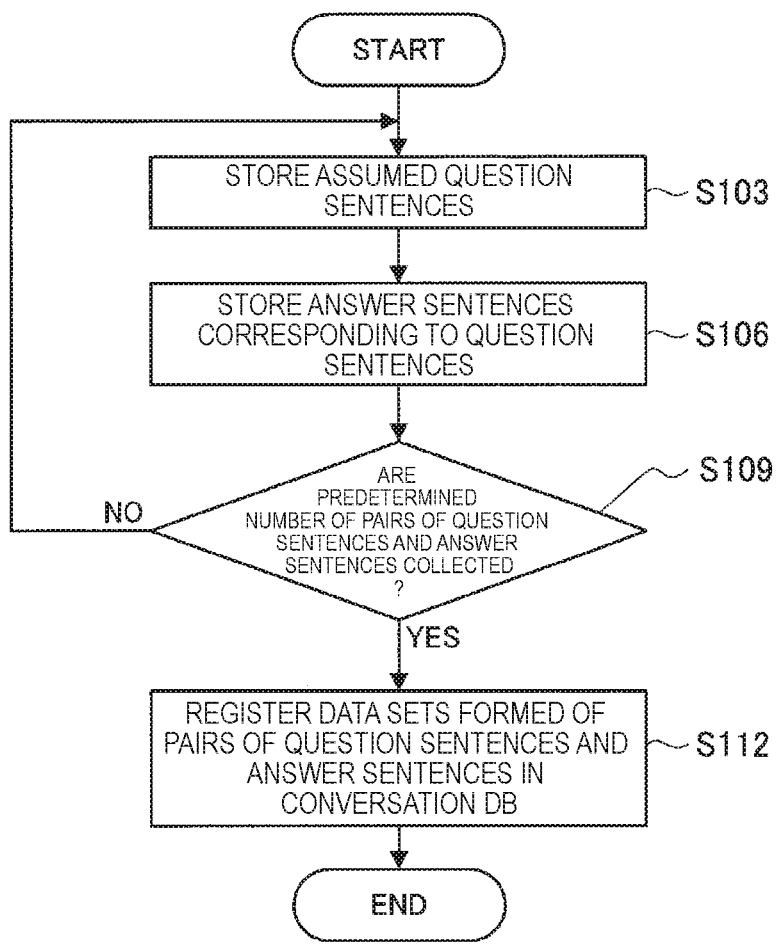
FIG. 5 is a flowchart illustrating a conversation DB generation process according to the embodiment.

FIG. 5 is a flowchart illustrating the conversation DB generation process 330 according to the embodiment. As illustrated in FIG. 5, the conversation DB generation unit 50 first stores assumed question sentences (step S103).

Subsequently, the conversation DB generation unit 50 stores answer sentences corresponding to (paired with) the question sentences (step S106).

Subsequently, the conversation DB generation unit 50 determines whether a predetermined number of pairs of question sentences and answer sentences (also referred to as conversation data) are collected (step S109).

Then, in a case in which the predetermined number of pairs of question sentences and conversation sentences are collected (Yes in step S109), the conversation DB generation unit 50 registers the data sets formed of many pairs of question sentences and answer sentences in the conversation DB 330 (step S112). As examples of the pairs of question sentences and answer sentences, for example, the following pairs are assumed.

Examples of pairs of question sentences and answer sentences

Pair 1

Question sentence: Good morning.

Answer sentence: How are you doing today?

Pair 2

Question sentence: How's the weather today?

Answer sentence: Today's weather is OO.

The pairs can be registered as conversation data in the conversation DB 330.

<3-2. Phoneme DB Generation Process>

Figure 6:
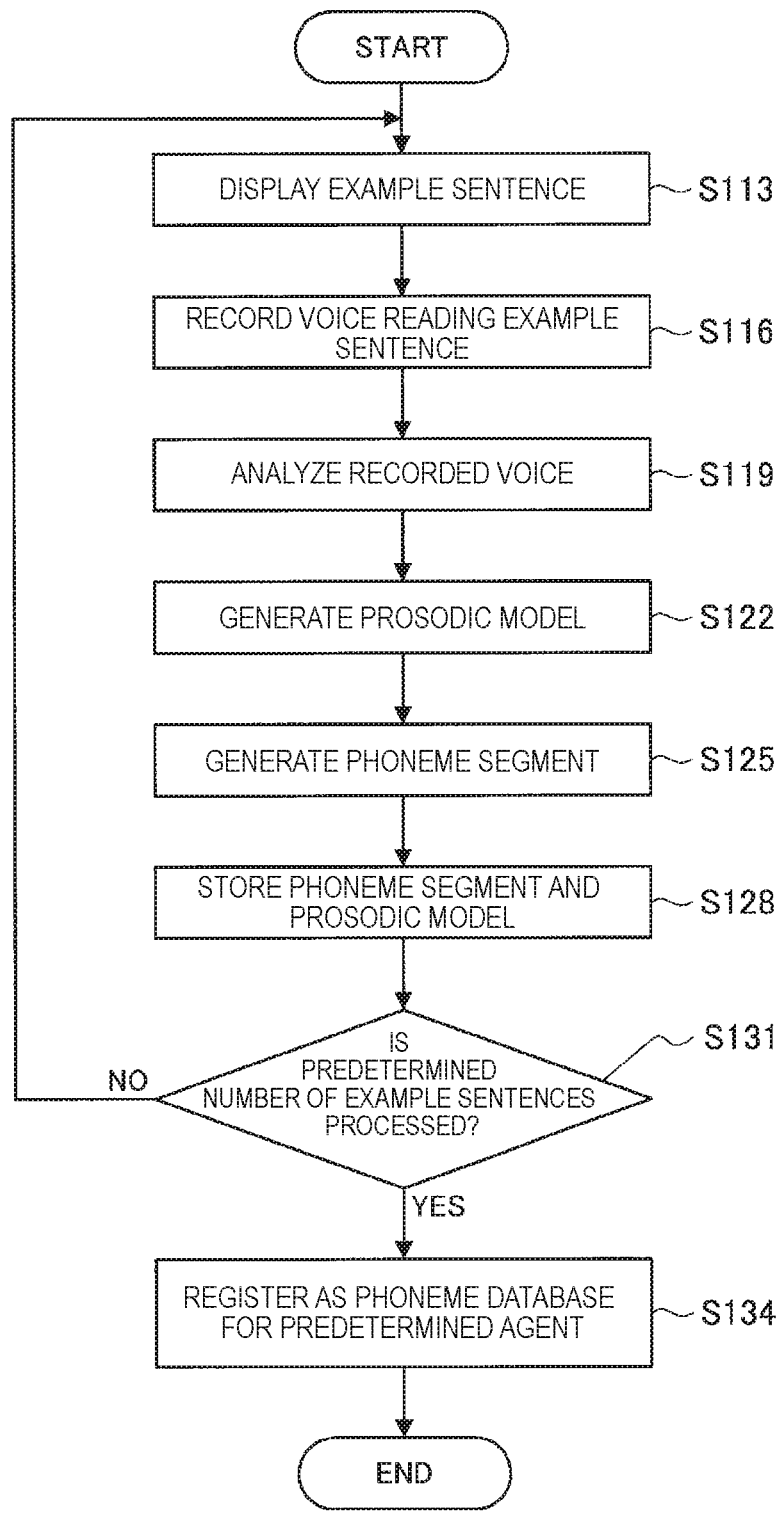
FIG. 6 is a flowchart illustrating a phoneme DB generation process according to the embodiment.

FIG. 6 is a flowchart illustrating a phoneme DB generation process according to the embodiment. As illustrated in FIG. 6, the phoneme DB generation unit 60 first displays an example sentence (step S113). In the display of the example sentence, for example, an example sentence necessary to generate phoneme data is displayed on a display of an information processing terminal (not illustrated).

Subsequently, the phoneme DB generation unit 60 records voice reading the example sentence (step S116) and analyzes the recorded voice (step S119). For example, voice information read by a person who takes charge of the voice of an agent is collected by the microphone of the information processing terminal. Then, the phoneme DB generation unit 60 receives and stores the voice information and further performs voice analysis.

Subsequently, the phoneme DB generation unit 60 generates a prosodic model on the basis of the voice information (step S122). The prosodic model extracts prosodic parameters indicating prosodic features of the voice (for example, a tone of the voice, strength of the voice, and a speech speed) and differs for each person.

Subsequently, the phoneme DB generation unit 60 generates a phoneme segment (phoneme data) on the basis of the voice information (step S125).

Subsequently, the phoneme DB generation unit 60 stores the prosodic model and the phoneme segment (step S128).

Subsequently, the phoneme DB generation unit 60 determines whether a predetermined number of the prosodic models and the phoneme segments are collected (step S131).

Then, in a case in which the predetermined number of prosodic models and phoneme segments are collected (Yes in step S131), the phoneme DB generation unit 60 registers the prosodic models and the phoneme segments as a phoneme database for a predetermined agent in the phoneme storage unit 40 (step S134).

<3-3. Dialogue Control Process>

Figure 7:
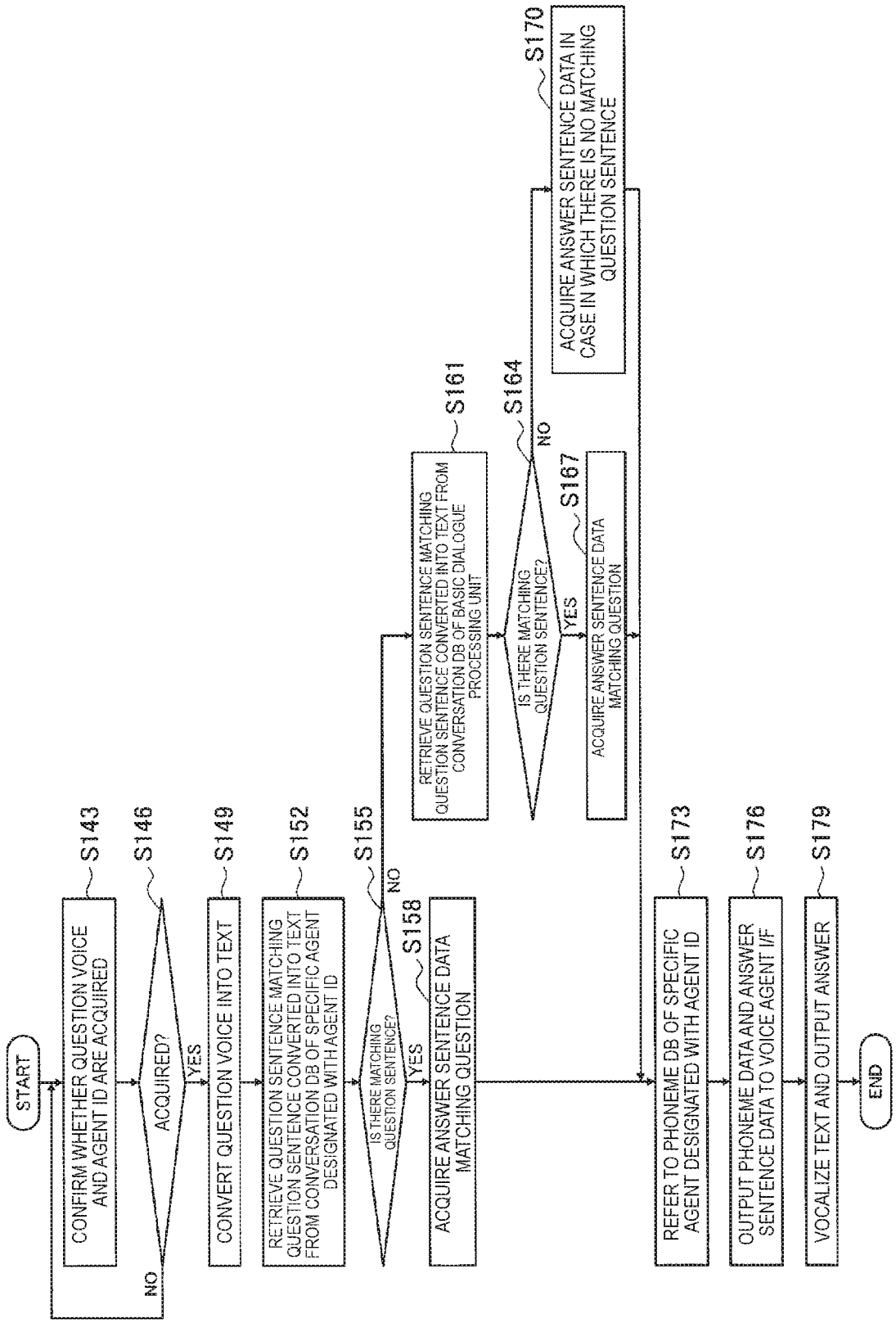
FIG. 7 is a flowchart illustrating a dialogue control process according to the embodiment.

FIG. 7 is a flowchart illustrating a dialogue control process according to the embodiment. As illustrated in FIG. 7, the voice agent I/F 20 first confirms whether question voice and an agent ID of a user are acquired (step S143). The agent ID is identification information indicating a specific agent such as the character A, the person B, or the person C. The user can purchase phoneme data of each agent. For example, an ID of the agent purchased in a purchase process is stored in the client terminal 1.

Subsequently, when the question voice and the agent ID of the user are acquired (Yes in step S146), the voice agent I/F 20 converts the question voice into text through voice recognition (step S149). The voice agent I/F 20 outputs the question sentence converted into text to the dialogue processing unit of the specific agent designated with the agent ID. For example, in the case of "agent ID: agent A" the voice agent I/F 20 outputs the question sentence converted into text to the character A dialogue processing unit 32.

Subsequently, the dialogue processing unit 30 retrieves a question sentence matching the question sentence converted into text from the conversation DB of the specific agent designated with the agent ID (step S152).

Subsequently, in a case in which there is a matching question (Yes in step S155), the character A dialogue processing unit 32 acquires answer sentence data corresponding to (paired with and stored) the question from the conversation DB of the specific agent (step S158).

Conversely, in a case in which there is no matching question (No in step S155), a question sentence matching the question sentence converted into text is retrieved from the conversation DB of the basic dialogue processing unit 31 (step S161).

In a case in which there is a matching question sentence (Yes in step S161), the basic dialogue processing unit 31 acquires the answer sentence data corresponding to (paired with and stored) the question from the conversation DB of the basic dialogue processing unit 31 (step S167).

Conversely, in a case in which there is no matching question (No in step S164), the basic dialogue processing unit 31 acquires answer sentence data (for example, an answer sentence "I don't understand the question") in a case in which there is no matching question sentence (step S170).

Subsequently, the character A dialogue processing unit 32 acquires phoneme data of the character A for generating voice of the answer sentence data with reference to the phoneme DB (herein, the character A phoneme DB 42) of the specific agent designated with the agent ID (step S173).

Subsequently, the acquired phoneme data and answer sentence data are output to the voice agent I/F 20 (step S176).

Then, the voice agent I/F 20 vocalizes the answer sentence data (text) (voice synthesis) using the phoneme data and transmits the answer sentence data to the client terminal 1 (step S179). The client terminal 1 reproduces the answer sentence through the voice of the character A.

<3-4. Conversation DB Updating Process>

Next, a process of updating the conversation DB 330 of each dialogue processing unit 300 will be described. In the embodiment, it is possible to extend the conversation DB 330 by a conversation with a user.

Figure 8:
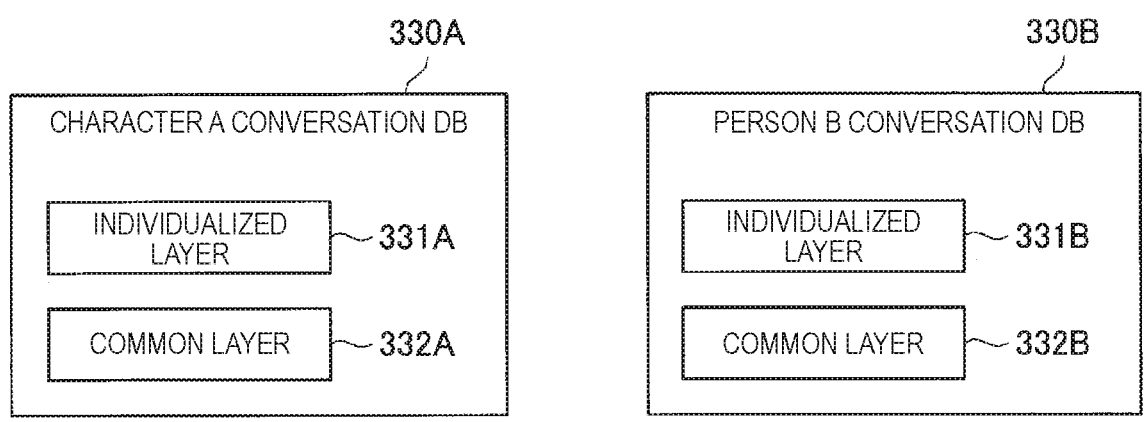
FIG. 8 is an explanatory diagram illustrating a data configuration example of the conversation DB according to the embodiment.

First, a data configuration example of the conversation DB 330 will be described supplementarily with reference to FIG. 8. FIG. 8 is an explanatory diagram illustrating a data configuration example of the conversation DB 330 according to the embodiment. As illustrated in FIG. 8, each conversation DB 330 includes two layers, an individualized layer 331 and a common layer 332. For example, in the case of a character A conversation DB 330A, conversation data in which personality or a feature of the character A is reflected is retained in the common layer 332A. On the other hand, in an individualized layer 331A, conversation data customized only for a user through a conversation with the user is retained. That is, the character A phoneme DB 42 and the character A dialogue processing unit 32 are supplied (sold) as a set to users. Then, certain users X and Y perform dialogues with the same character A at first (conversation data retained in the common layer 332A is used). However, as the dialogues continue, conversation data customized only for each user is accumulated in the individualized layer 331A for each user. In this way, it is possible to supply the users X and Y with dialogues with the character A in accordance with preferences of the users X and Y.

In addition, even in a case in which the agent "person B" is an average person of each generation who has no specific personality such as the character A, the conversation data can be customized only for the user. That is, for example, in a case in which the "person B" is a "person in his or her twenties," average conversation data of his or her twenties is retained in the common layer 332B and dialogue with the user is continued so that the customized conversation data is retained in the individualized layer 331B of each user. As dialogues with the user continue, customized conversation data is retained in the individualized layer 331B for each user. In addition, the user can also select favorite phoneme data such as "male," "female," "high-tone voice," or "low-tone voice" as the voice of the person B from the person B phoneme DB 43 and can purchase the favorite phoneme data.

Figure 9:
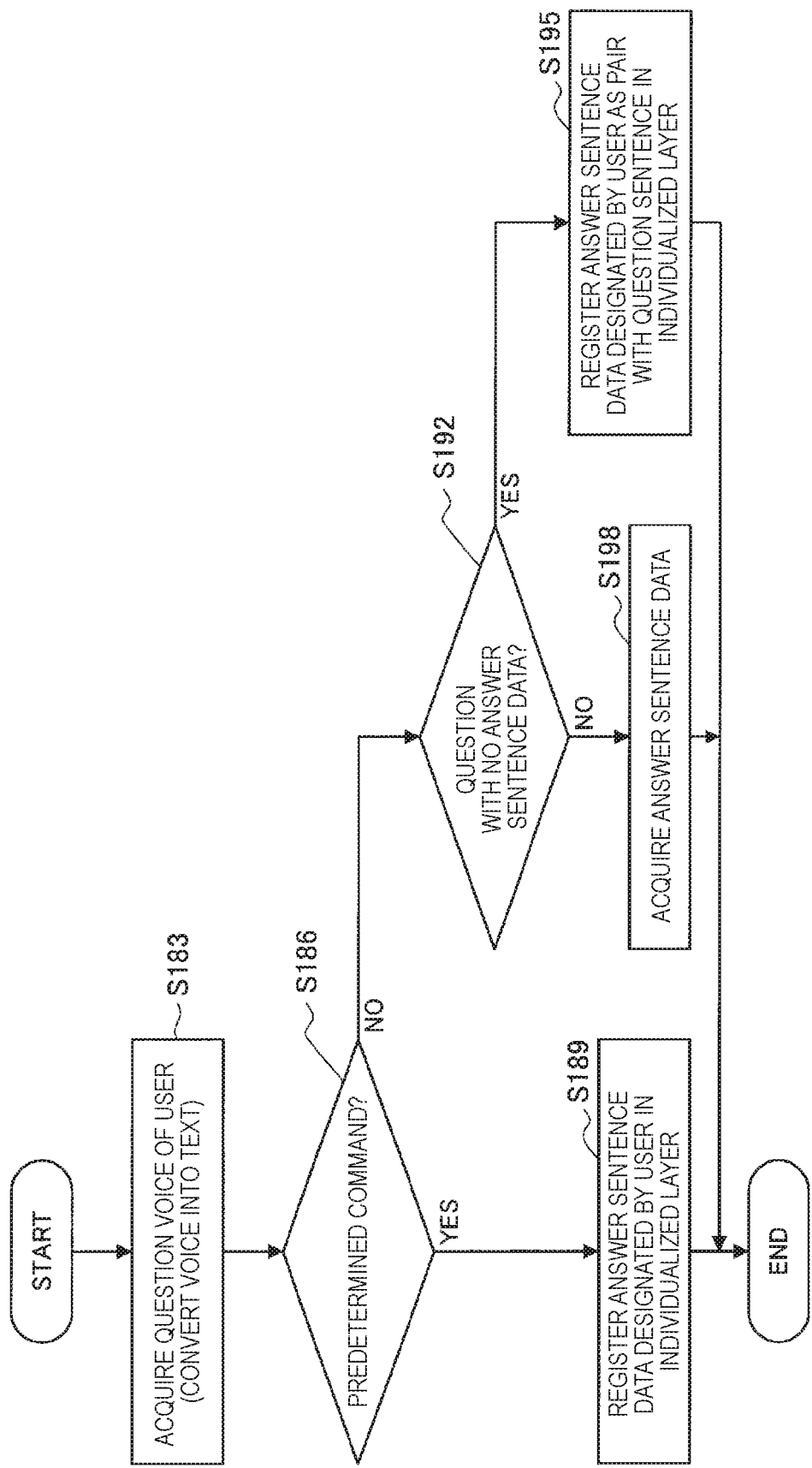
FIG. 9 is a flowchart illustrating a process of updating the conversation DB according to the embodiment.

A specific process at the time of the customization of the conversation DB 330 will be described with reference to FIG. 9. FIG. 9 is a flowchart illustrating a process of updating the conversation DB 330 according to the embodiment.

As illustrated in FIG. 9, the voice agent I/F 20 first acquires (receives) question voice of the user from the client terminal 1 and converts the question voice into text through voice recognition (step S183). The data (question sentence data) converted into text is output to the dialogue processing unit (herein, for example, the character A dialogue processing unit 32) of the specific agent designated by the agent ID.

Subsequently, the character A dialogue processing unit 32 determines whether the question sentence data is a predetermined command (step S186).

Subsequently, in a case in which the question sentence data is the predetermined command (Yes in step S186), the character A dialogue processing unit 32 registers answer sentence data designated by the user as a pair with the question sentence data in the individualized layer 331A of the conversation DB 330A (step S189). The predetermined command may be, for example, a word "NG" or "Setting." For example, the conversation DB of the character A can be customized in accordance with a flow of the following conversation.

User: "Good morning"
Character A: "Good morning"
User: "NG. Answer to fine do your best"
Character A: "Fine do your best"

In the flow of the foregoing conversation, "NG" is the predetermined command. After "NG" is spoken by the user, the character A dialogue processing unit 32 registers answer sentence data "Fine do your best" designated by the user as a pair with the question sentence data "Good morning" in the individualized layer 331A of the conversation DB 330A.

Conversely, in a case in which the question sentence data is not the predetermined command (No in step S186), the character A dialogue processing unit 32 retrieves the answer sentence data retained as the pair with the question sentence data from the character A conversation DB 330A. In a case in which the answer sentence data retained as the pair with the question sentence data is not retained in the character A conversation DB 330A, that is, a question of the user is a question with no answer sentence (Yes in step S192), the character A dialogue processing unit 32 registers the answer sentence data designated by the user as a pair with the question sentence in the individualized layer 331A (step S195). For example, in a flow of the following conversation, the conversation DB of the character A can be customized.

User A: "Fine?"
Character A: "I can't understand the question" (answer data example in case in which there is no corresponding answer)
User: "When I questions "Fine?," answer to "Fine today""
Character A: "Fine today"

In the flow of the foregoing conversation, since there is no answer sentence data maintained to be paired with "Fine?," "I can't understand the question" which is an example of the answer data in the case in which there is no corresponding answer is acquired by the character A dialogue processing unit 32, is output along with corresponding phoneme data of the character A to the voice agent I/F 20, and is reproduced in the client terminal 1. Subsequently, when the answer sentence "Fine today" designated by the user is input, the character A dialogue processing unit 32 registers "Fine today" as the pair with the question sentence data "Fine?" in the individualized layer 331A.

Conversely, in a case in which the question of the user is a question for which there is an answer sentence (No in step S192), the character A dialogue processing unit 32 acquires the answer sentence data and outputs the answer sentence data along with the corresponding phoneme data of the character A to the voice agent I/F 20. Then, the answer sentence is reproduced through the voice of the character A in the client terminal 1 (step S198).

Figure 10:
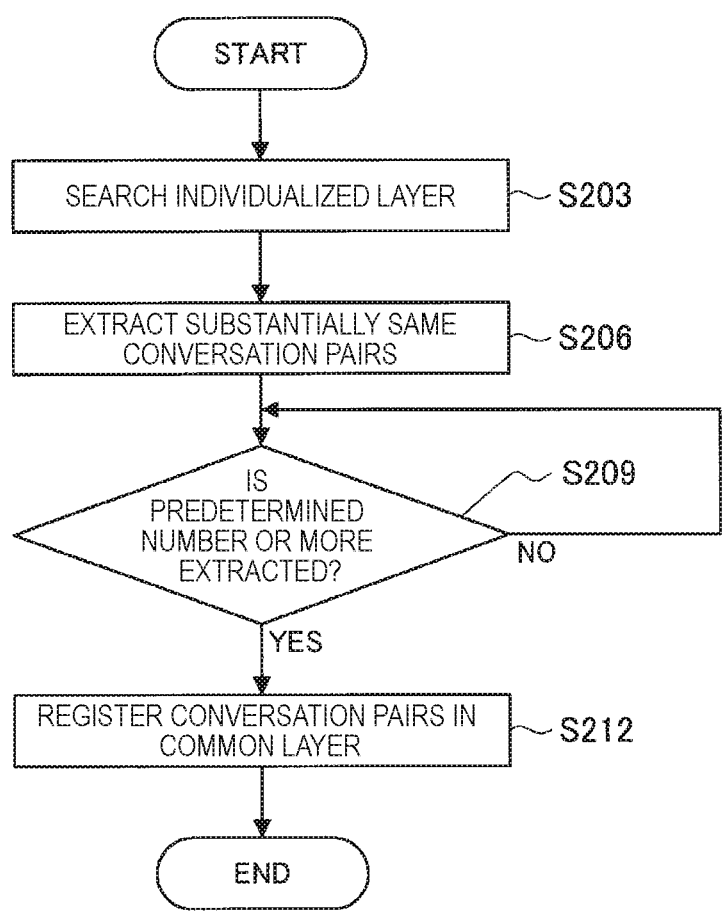
FIG. 10 is a flowchart illustrating a conversation data transition process from an individualized layer to a common layer according to the embodiment.

Next, conversation data transition from an individualized layer to a common layer will be described with reference to FIG. 10. FIG. 10 is a flowchart illustrating conversation data transition process from an individualized layer to a common layer according to the embodiment. Herein, for example, the conversation data transition process from the individualized layer 331A to the common layer 332A of the character A dialogue processing unit 32 will be described.

As illustrated in FIG. 10, the character A dialogue processing unit 32 first searches the individualized layer 331A for each user periodically (step S203) and extracts conversation pairs with substantially the same content (the pair of question sentence data and answer sentence data) (step S206). For the conversation pairs with the substantially same content, for example, a pair of question sentence "Fine?" and answer sentence "Fine today!" and a pair of question sentence "Are you fine?" and answer sentence "Fine today!" can be determined to be the conversation pairs with substantially the same content because the question sentences are different only in a polite expression or not.

Subsequently, when a predetermined number or more of conversation pairs are extracted from the individualized layer 331A for each user (Yes in step S209), the character A dialogue processing unit 32 registers the conversation pairs in the common layer 332A (for each user) (step S212).

In this way, when the conversation pairs with substantially the same content in the individualized layer 331 for each user transition to the common layer 332, the common layer 332 can be extended (the conversation pairs can be expanded).

Figure 11:
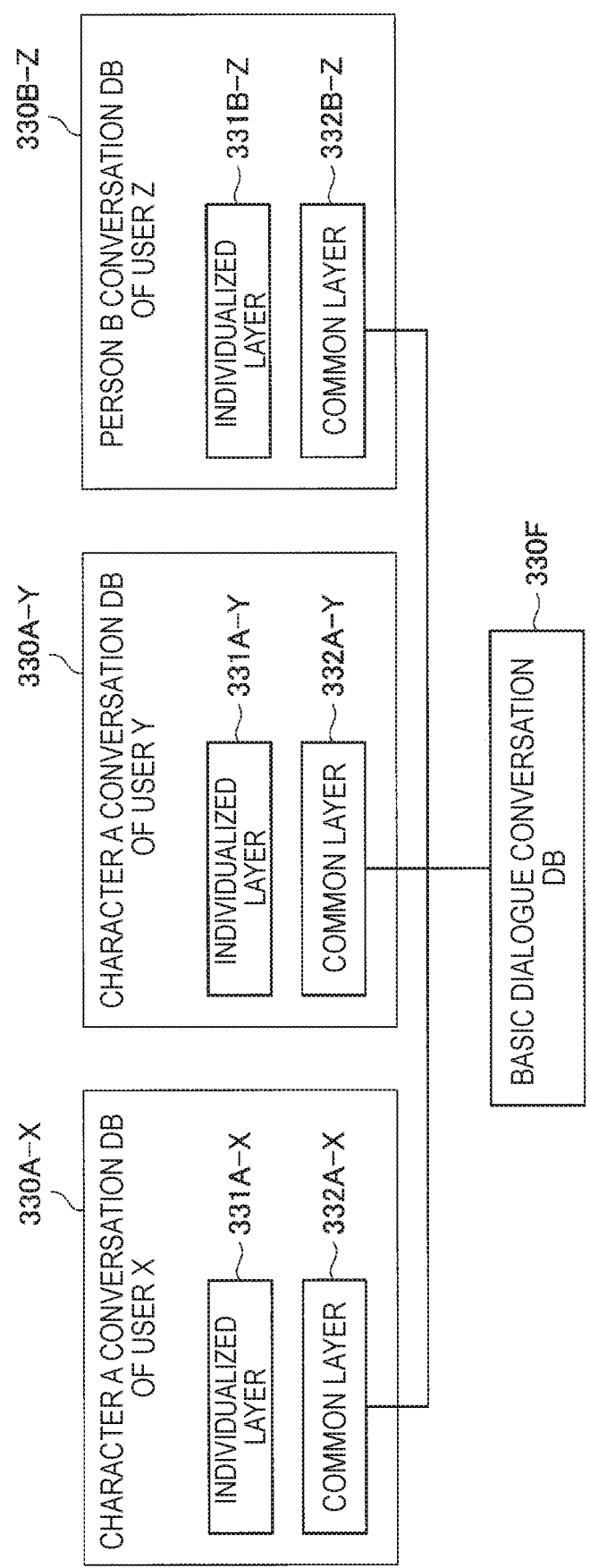
FIG. 11 is an explanatory diagram illustrating transition of conversation data to a basic dialogue conversation DB according to the embodiment.

In addition, in the embodiment, the conversation data can transition from the conversation DB (specifically, the common layer) of the specific agent to the basic dialogue conversation DB, and thus the basic dialogue conversation DB can also be extended. FIG. 11 is an explanatory diagram illustrating transition of conversation data to the basic dialogue conversation DB 330F according to the embodiment. For example, in a case in which the users X and Y each select (purchase) the agent "character A" and a user Z selects (purchases) the agent "person B," as illustrated in FIG. 11, a character A conversation DB 330A-X of the user X, a character A conversation DB 330A-Y of the user Y, and a person B conversation DB 330-Z of the user Z can be in the dialogue processing unit 30. In this case, in individualized layers 331A-X, 331A-Y, and 331B-Z, unique (customized) conversation pairs are gradually registered in accordance with dialogues with the users X, Y, and Z (see FIG. 9). Subsequently, when substantially the same conversation pairs in the same individualized layers 331A-X and 331A-Y become a predetermined number, substantially the same conversation pairs are registered in common layers 332A-X, 332A-Y for the users, respectively (see FIG. 10).

Figure 12:
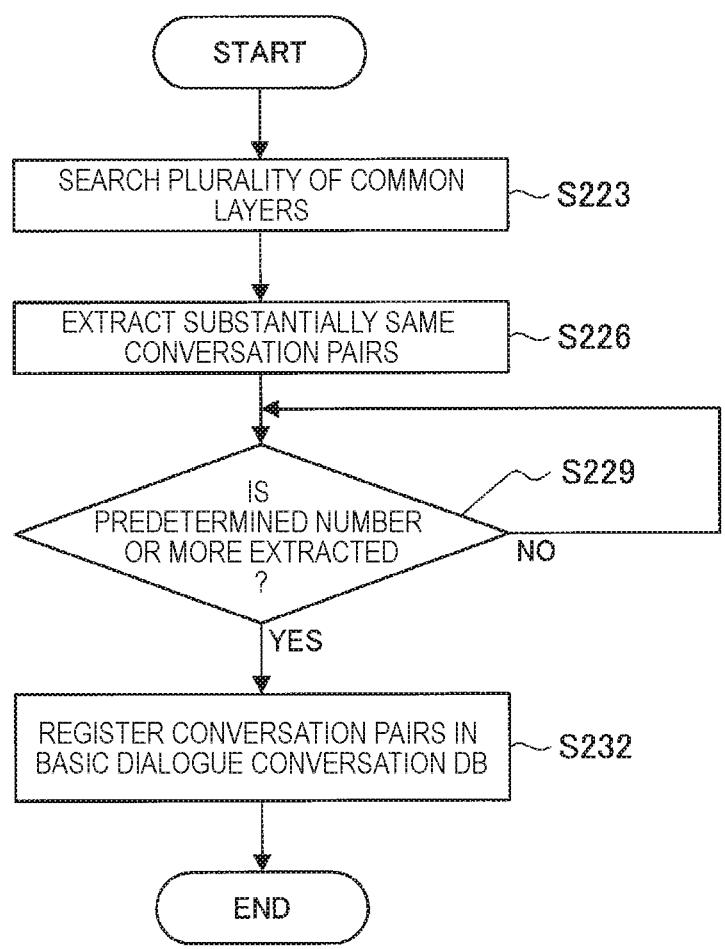
FIG. 12 is a flowchart illustrating a conversation data transition process to a basic dialogue DB according to the embodiment.

Then, in a case in which a predetermined number or more of substantially same conversation pairs are extracted from the common layers 332A-X, 332A-Y, and 332B-Z of the plurality of agents (which may include different agents), the dialogue processing unit 30 causes the conversation pairs to transition to a high-order basic dialogue conversation DB 330F. The basic dialogue conversation DB 330F is a conversation DB included in the basic dialogue processing unit 31. Thus, it is possible to extend the basic dialogue conversation DB 330F (expand the conversation pairs). The data transition process will be described specifically with reference to FIG. 12. FIG. 12 is a flowchart illustrating the conversation data transition process to the basic dialogue DB 330F according to the embodiment.

As illustrated in FIG. 12, the dialogue processing unit 30 first searches the plurality of common layers 332 of the conversation DBs 330 periodically (step S223) and extracts substantially the same conversation pairs (step S226).

Subsequently, when the predetermined number or more of substantially same conversation pairs are extracted from the plurality of common layers 332 (Yes in step S229), the dialogue processing unit 30 registers the conversation pairs in the basic dialogue conversation DB 330F (step S232).

In this way, by causing the conversation pairs with substantially the same content in the common layers 332 of the conversation DBs 330 in the plurality of agents to transition to the basic dialogue conversation DB 330F, it is possible to extend the basic dialogue conversation DB 330F (expand the conversation pairs).

<3-5. Advertisement Output Process>

Next, an advertisement information insertion process by the advertisement insertion processing unit 70 will be described with reference to FIGS. 13 and 14. In the embodiment, the advertisement insertion processing unit 70 can insert advertisement information stored in the advertisement DB 72 into speech of an agent. The advertisement information can be registered in advance in the advertisement DB 72. FIG. 13 is a diagram illustrating an example of advertisement information registered in the advertisement DB 72 according to the embodiment.

As illustrated in FIG. 13, advertisement information 621 includes, for example, an agent ID, a question sentence, advertisement content, a condition, and a probability. The agent ID designates an agent speaking advertisement content, the question sentence designates a question sentence of a user which serves as a trigger and into which advertisement content is inserted, and the advertisement content is an advertisement sentence inserted into dialogue of an agent. In addition, the condition is a condition on which advertisement content is inserted and the probability indicates a probability at which advertisement content is inserted. For example, in an example illustrated in the first row of FIG. 13, in a case in which a word "chocolate" is included in a question sentence from a user who is 30 years old or less in dialogue with the agent "character A," advertisement content "chocolate newly released by "BB company is delicious because milk is contained much" is inserted into the question sentence. In addition, when the advertisement content is inserted every time at the time of speaking the question sentence serving as a trigger, the user feels troublesome. Therefore, in the embodiment, a probability at which the advertisement is inserted may be set. The probability may be decided in accordance with advertisement charges. For example, the probability is set to be higher as the advertisement charges are higher.

The advertisement content insertion process will be described specifically with reference to FIG. 14. FIG. 14 is a flowchart illustrating the advertisement content insertion process according to the embodiment.

Figure 14:
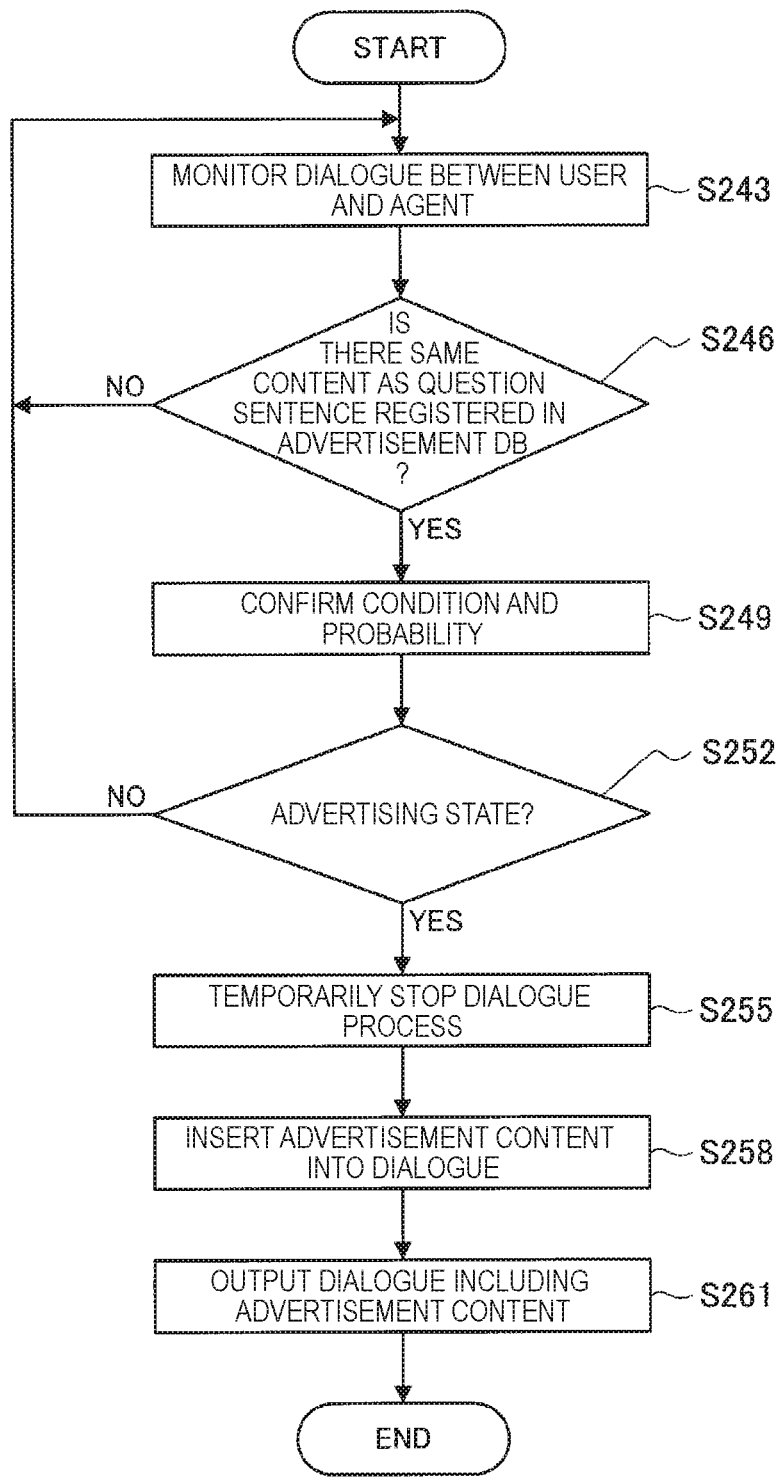
FIG. 14 is a flowchart illustrating an advertisement content insertion process according to the embodiment.

As illustrated in FIG. 14, the advertisement insertion processing unit 70 first monitors dialogue (specifically, a dialogue process by the dialogue processing unit 30) between the user and the agent (step S243).

Subsequently, the advertisement insertion processing unit 70 determines whether a question sentence with the same content as a question sentence registered in the advertisement DB 72 appears in the dialogue between the user and the agent (step S246).

Subsequently, in a case in which the question sentence with the same content appears (Yes in step S246), the advertisement insertion processing unit 70 confirms the condition and the probability of the advertisement insertion associated with the corresponding question sentence (step S249).

Subsequently, the advertisement insertion processing unit 70 determines whether a current state is an advertising state on the basis of the condition and the probability (step S252).

Subsequently, in a case in which the current state is the advertising state (Yes in step S252), the advertisement insertion processing unit 70 temporarily interrupts the dialogue process by the dialogue processing unit 30 (step S255) and inserts the advertisement content into the dialogue (step S258). Specifically, for example, the advertisement content is inserted into an answer sentence of the agent for the question sentence of the user.

Then, the dialogue (conversation sentence data) including the advertisement content is output from the dialogue processing unit 30 to the voice agent I/F 20, is transmitted from the voice agent I/F 20 to the client terminal 1, and is reproduced through voice of the agent (step S261). Specifically, for example, the advertisement content can be presented as a speech of the character A to the user, for example, in the following conversation.

User: "Good morning"

Character A: "Good morning! How are you doing today?"

User: "Fine. I want to eat some delicious food"

Character A: "I heard that grilled meat at CC store is delicious"

In the conversation, the corresponding answer sentence "Good morning! How are you doing today?" retrieved from the conversation DB of the character A is first output as voice in response to the question sentence "Good Morning" of the user. Subsequently, since the question sentence "I want to eat some delicious food" serving as the trigger of the advertisement insertion is included in the question sentence "Fine. I want to eat some delicious food" of the user (see second row of FIG. 13), the advertisement insertion processing unit 70 performs the advertisement insertion process and outputs the answer sentence with the advertisement content "I heard that grilled meat at CC store is delicious" through the voice of the character A.

The conversation data registration process, the phoneme DB generation process, the dialogue control process, the conversation DB updating process, and the advertisement insertion process have been described above as the basic operation processes of the communication control system according to the embodiment. In addition, in the communication control system according to the embodiment, the feedback acquisition processing unit 80 can obtain reliable feedback on a specific experience further naturally through a dialogue with an agent from a user who has the specific experience without imposing a burden on the user. Hereinafter, the feedback acquisition processing unit 80 will be described specifically with reference to FIGS. 15 to 28.

4. FEEDBACK ACQUISITION PROCESS

<4-1. Configuration>

Figure 15:
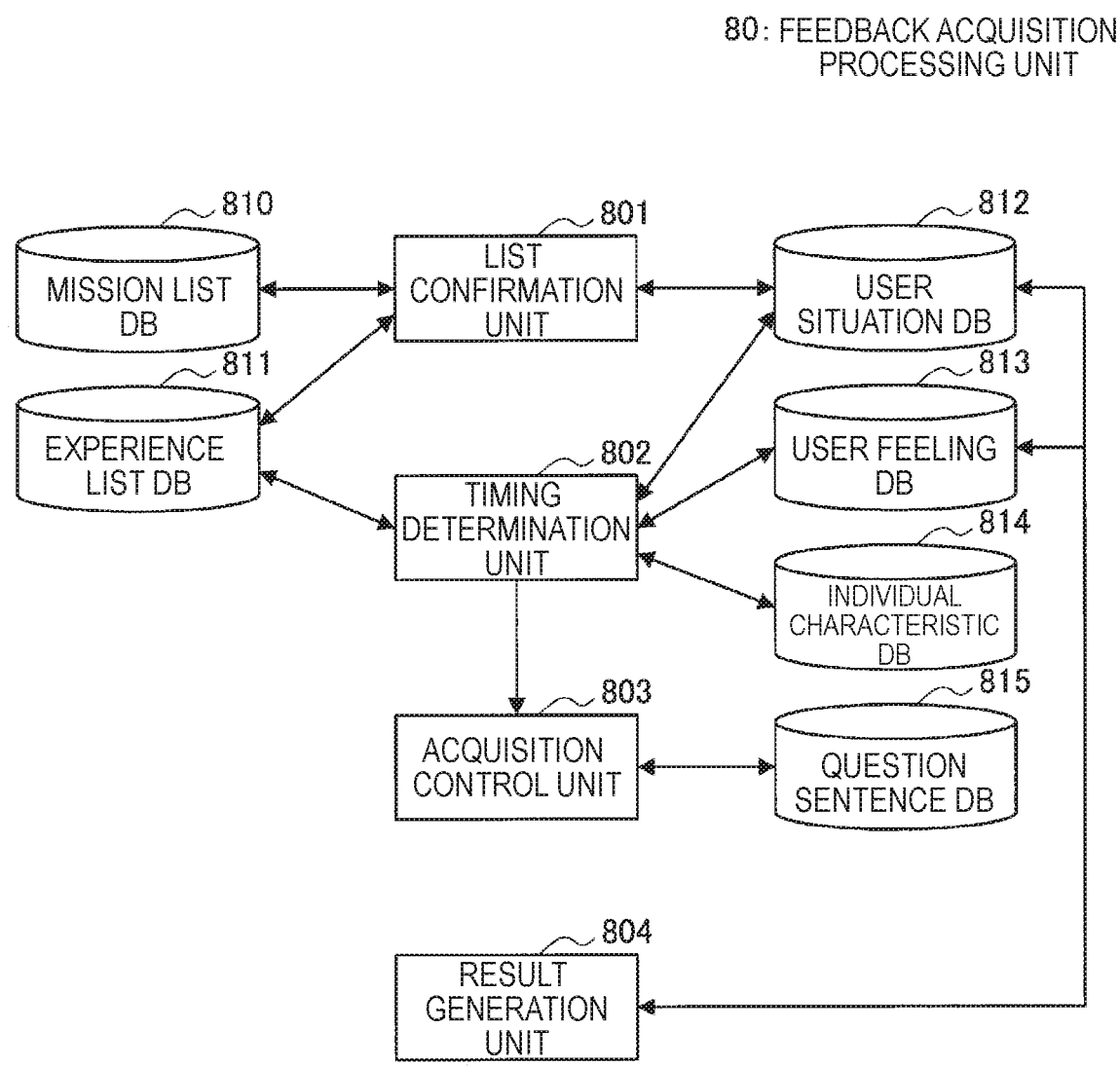
FIG. 15 is a diagram illustrating a configuration example of a feedback acquisition processing unit according to the embodiment.

FIG. 15 is a diagram illustrating a configuration example of the feedback acquisition processing unit 80 according to the embodiment. As illustrated in FIG. 15, the feedback acquisition processing unit 80 includes a list confirmation unit 801, a timing determination unit 802, an acquisition control unit 803, a result generation unit 804, a mission list DB 810, an experience list DB 811, a user situation DB 812, a user feeling DB 813, an individual characteristic DB 814, and a question sentence DB 815.

The list confirmation unit 801 confirms a mission registered in the mission list DB 810 and estimates whether the user has a specific experience which is a mission target. In the mission list DB 810, a feedback mission requested by a company that provides an experience (specifically, a company that provides an object or content) or a questionnaire agent company that receives a request from a company and conducts questionnaires on an experience is registered. The feedback mission is transmitted via the network 3 from, for example, an information processing device of a company or the like, is received by the communication unit included in the voice agent I/F 20, and is output to the feedback acquisition processing unit 80. Herein, FIG. 16 illustrates an example of a mission list registered in the mission list DB 810 according to the embodiment.

As illustrated in FIG. 16, the mission list includes mission details (specifically, which feedback on which experiences is obtained) and a time limit in which a mission is to be executed. For example, a mission for obtaining feedback (an opinion, an impression, or the like) on a chocolate sample of BB company or a mission for obtaining feedback on a ramen sample of DD company is registered. In this case, the list confirmation unit 801 estimates whether the user has a specific experience (behavior) of "eating the chocolate sample of BB company" or a specific experience of "eating a ramen sample of DD company." The experience may be estimated, for example, by requesting the dialogue processing unit 30 to output a question sentence ("Have you eaten chocolate of BB company?") for directly confirming with the user whether the user has the specific experience is output through voice of the agent.

In addition, the list confirmation unit 801 can also estimate an experience with reference to the user situation DB 812 in which situations of the user are accumulated. In the user situation DB 812, the situations of the user based on information acquired from an external server that performs a schedule management service or the like, context of dialogues acquired from the dialogue processing unit 30, or the like are stored. Further, behavior information of an individual user may be acquired from a wearable terminal (a transmissive or non-transmissive head-mounted display (HMD), a smart band, a smart watch, smart eyeglasses, or the like) worn on the body of the user, and the behavior information of the individual user may be accumulated as user situations in the user situation DB 812. Examples of the behavior information of the individual user acquired from the wearable terminal include acceleration sensor information, various kinds of biological information, positional information, and a captured image captured in the periphery of the user (including an angle of view of the user) by a camera installed in the wearable terminal.

The list confirmation unit 801 registers the experience information in the experience list DB 811 when it is confirmed that the user has an experience of a mission target. FIG. 17 is a diagram illustrating an example of an experience list registered in the experience list DB 811 according to the embodiment. For example, in a case in which it could be confirmed that the user has, for example, the specific experience of "eating the chocolate sample of BB company," as illustrated in FIG. 17, the mission targeting the experience "obtaining feedback on the chocolate sample of BB company" can be registered in conjunction with experience date information "Jan. 2, 20XX."

The timing determination unit 802 has a function of determining a timing to execute a mission registered in the experience list DB 811 in accordance with context of the user. The context of the user is a current situation or feeling of the user and can be determined with reference to, for example, the user situation DB 812, the user feeling DB 813, or the individual characteristic DB 814.

Herein, the user feeling DB 813 is a storage unit that stores a history of user feelings. The user feelings stored in the user feeling DB 813 can be estimated on the basis of biological information (a pulse rate, a heart rate, a heart sound, a blood pressure, respiration, a body temperature, a perspiration amount, an electroencephalogram, myoelectricity, or the like), voice information (intonation of a voice), or a captured image (a facial image, an eye image, or the like of the user) acquired from a wearable terminal worn by the user. In addition, the user feelings may also be estimated from context of a conversation between the user and the agent performed through the dialogue processing unit 30 or a result of voice analysis. Examples of the feeling information of the user include busy, irritated, depressed, and enjoyable feelings, a relaxed state, a focused state, and a tense state. In addition, the individual characteristic DB 814 is a storage unit that stores personality traits, habits, or the like of an individual. While the user situation DB 812 or the user feeling DB 813 stores the situations (a history of the situations) of the user for a relatively short time, the individual characteristic DB 814 stores the personality traits or the habits of the individual user for a relatively long time such as half of a year or 1 year.

For example, the timing determination unit 802 acquires a current situation of the user from the user situation DB 812 and determines an appropriate timing to execute a mission, that is, to ask the user a question for obtaining feedback on a specific experience. More specifically, the timing determination unit 802 may determine a period of time in which there is no schedule on the basis of schedule information of the user as an appropriate timing. In addition, the timing determination unit 802 may acquire a current feeling of the user from the user feeling DB 813 and determine the appropriate timing to ask the user a question for obtaining feedback on the specific experience. More specifically, the timing determination unit 802 may determine the appropriate timing so that a time at which the user is experiencing an intense emotion, is in an excited state, or is in a busy and nervous state is avoided. The details of a timing determination process will be described below.

The acquisition control unit 803 performs control such that question sentence data for obtaining the feedback on the specific experience is generated, the question is output as speech of the agent at the timing determined by the timing determination unit 802 from the client terminal 1, and an answer of the user to the question is acquired as feedback. Specifically, the question sentence data is output from the client terminal 1 via the dialogue processing unit 30 and the voice agent I/F 20. The question sentence data is generated with reference to the question sentence DB 815. The details of a process of generating the question sentence data and a process of acquiring the feedback in the acquisition control unit 803 will be described below.

The result generation unit 804 generates a result on the basis of the feedback acquired from the user. The result generation unit 804 may generate the result in consideration of a user state at the time of the answer in addition to a voice recognition result (text) of answer voice of the user to the question. The result of the feedback can be matched (associated) with the mission list of the mission list DB 810 to be stored in the mission list DB 810. In addition, the generated result can be provided as an answer to, for example, a company or the like that has registered the mission. Herein, the generated result is matched with the mission list to be stored in the mission list DB 810, but the embodiment is not limited thereto. The generated result may be matched with the mission list to be stored in another DB (storage unit).

The configuration of the feedback acquisition processing unit 80 according to the embodiment has been described above specifically. Next, an operation process according to the embodiment will be described specifically with reference to FIGS. 18 to 28.

<4-2. Operation Process>

Figure 18:
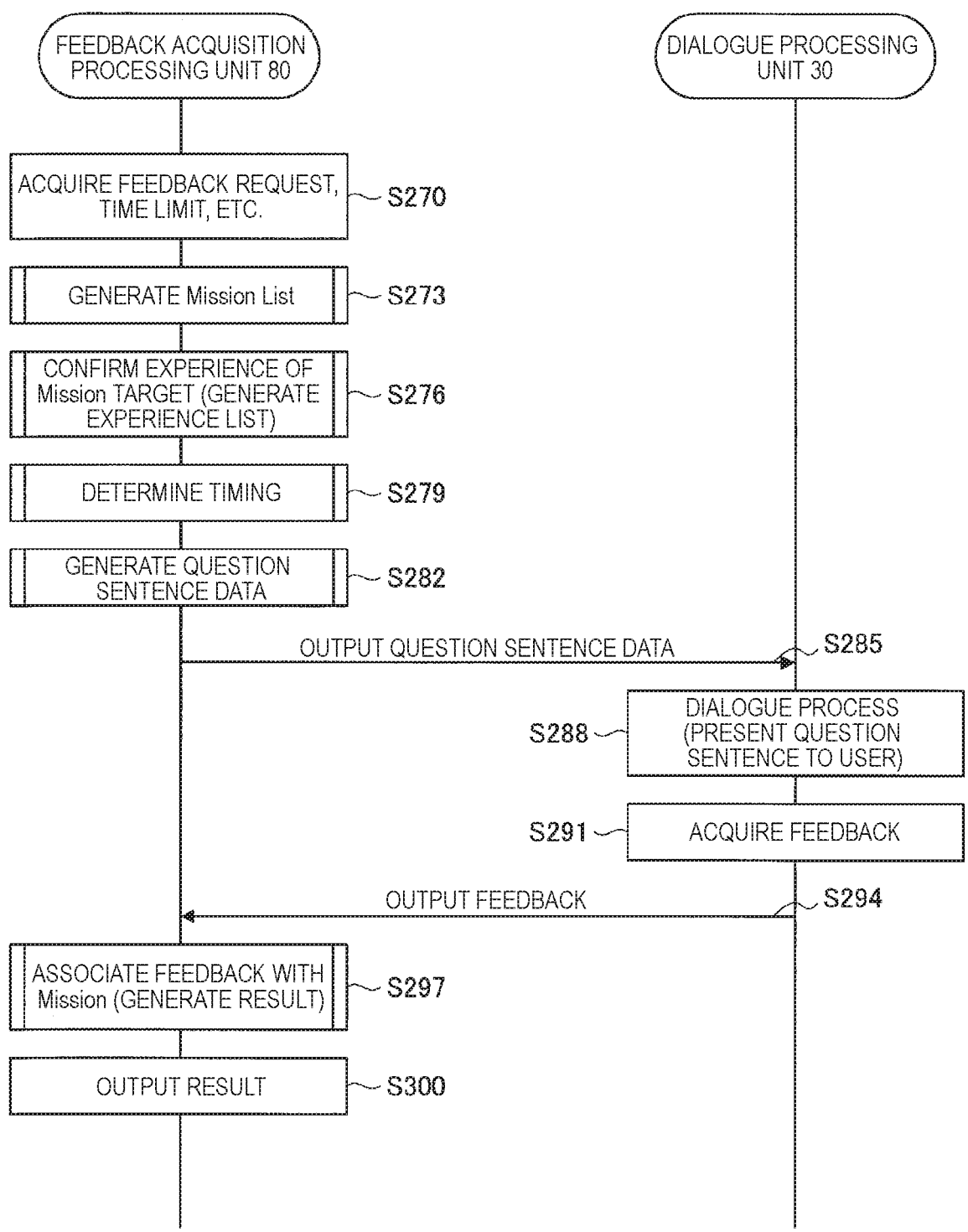
FIG. 18 is a flowchart illustrating a feedback acquisition process according to the embodiment.

FIG. 18 is a flowchart illustrating a feedback acquisition process according to the embodiment. As illustrated in FIG. 18, the feedback acquisition processing unit 80 first acquires a feedback request, a request time limit, and the like from, for example, a company that provides an experience (provides an object or content) or an information processing device of a questionnaire agent company side that receives a request from a company and conducts questionnaires (step S270).

Figure 19:
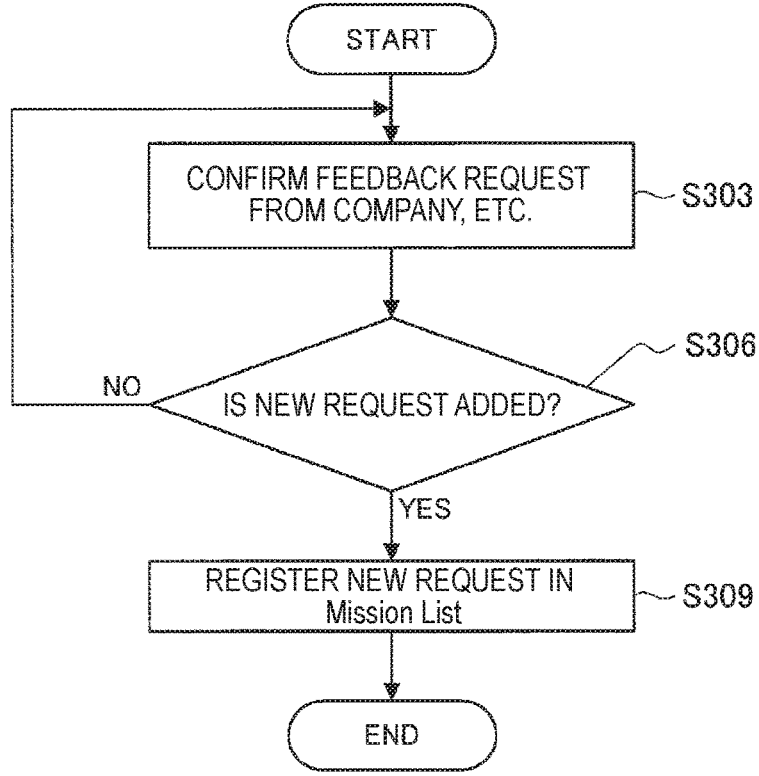
FIG. 19 is a flowchart illustrating a mission list generation process according to the embodiment.

Subsequently, the feedback acquisition processing unit 80 generates a mission list by registering the acquired mission information in the mission list DB 810 (step S273). Here, the details of the mission list generation process are illustrated in FIG. 19. As illustrated in FIG. 19, the feedback acquisition processing unit 80 checks the feedback request from a company or the like (step S303). In a case in which a new request is transmitted from an information processing device of a company or the like and is added (Yes in step S306), the feedback request can be registered as a mission list in the mission list DB 810 (step S309). An example of the mission list registered in the mission list DB 810 has been described above with reference to FIG. 16.

Figure 20:
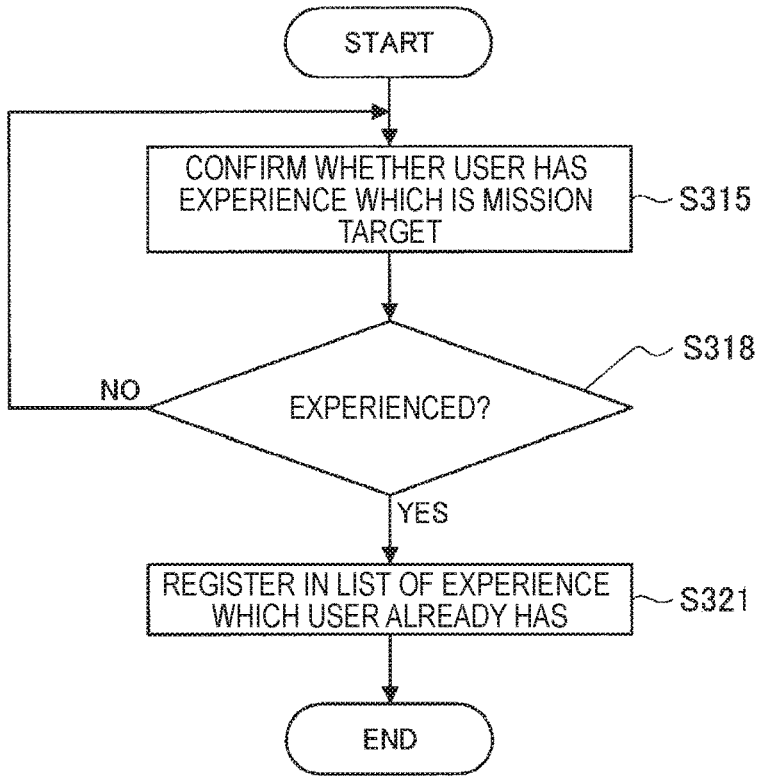
FIG. 20 is a flowchart illustrating an experience list generation process according to the embodiment.

Subsequently, the feedback acquisition processing unit 80 causes the list confirmation unit 801 to confirm whether the user has an experience of a mission target and performs generating of the experience list (step S276). Herein, the details of an experience list generation process are illustrated in FIG. 20. As illustrated in FIG. 20, the list confirmation unit 801 confirms whether the user has the experience which is the mission target (step S315). In a case in which it could be estimated that the user has the experience (Yes in step S318), experience information is registered as a list of the experience which the user already has in the experience list DB 811 (step S321). An example of the experience list registered in the experience list DB 811 has been described above with reference to FIG. 17.

Figure 21:
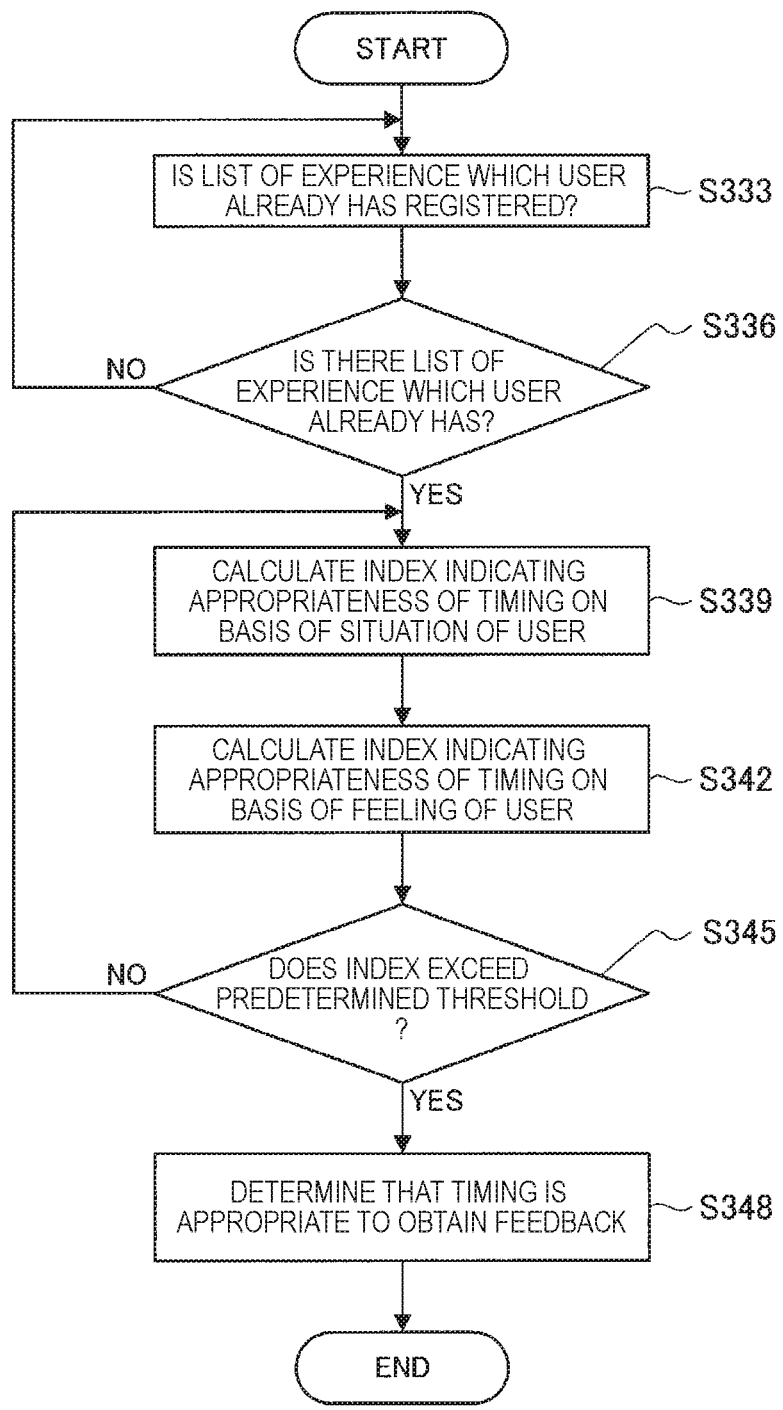
FIG. 21 is a flowchart illustrating a timing determination process according to the embodiment.

Subsequently, the timing determination unit 802 of the feedback acquisition processing unit 80 determines an appropriate timing at which the user is asked to answer a question for obtaining feedback (step S279). Herein, the details of the timing determination process will be described with reference to FIGS. 21 and 22. FIG. 21 is a flowchart illustrating the timing determination process according to the embodiment.

As illustrated in FIG. 21, the timing determination unit 802 first confirms whether the list of the experience which the user already has is registered in the experience list DB 811 (step S333).

Subsequently, in a case in which the list of the experience which the user already has is registered (Yes in step S336), the timing determination unit 802 calculates an index indicating appropriateness of a timing on the basis of a situation of the user (step S339). The situation of the user is schedule information, a behavior state, or the like of the user and is acquired from the user situation DB 812. In the user situation DB 812, the situations of the user are periodically accumulated so that a change in a user situation for a relatively short time can be ascertained. In addition, in the embodiment, the user situation is associated with the index indicating appropriateness of a timing for obtaining feedback.

In addition, the timing determination unit 802 calculates the index indicating appropriateness of a timing on the basis of a feeling of the user (step S342). In addition, a feeling of the user is acquired from the user feeling DB 813. In the user feeling DB 813, feelings of the user are periodically accumulated so that a change in a user feeling for a relatively short time can be ascertained. In addition, in the embodiment, the user feeling is associated with an index indicting appropriateness of a timing for obtaining feedback.

Subsequently, the timing determination unit 802 calculates a sum value (or an average value) of the indexes on the basis of a timing index based on the user situation and a timing index based on the user feeling and determines whether the calculated index exceeds a predetermined threshold (step S345).

Then, in a case in which the index exceeds the predetermined threshold (Yes in step S345), the timing determination unit 802 determines that the timing is appropriate for obtaining the feedback (step S348).

In this way, in the embodiment, an appropriate timing is determined on the basis of the two components, the user situation and the user feeling. Here, examples of a timing index are illustrated in FIG. 22. As illustrated in FIG. 22, indexes (for example, numerical values of −5 to +5) indicating the appropriateness of a timing are associated with situations or feelings of the user. For example, in a situation in which a schedule of the user is empty (that is, a period of time which there is no schedule) and further in a case in which a feeling of the user is in a calm state, the timing determination unit 802 calculates an average value of an index of "+3" corresponding to the user situation and an index of "+4" corresponding to the user feeling as a timing index by the following Expression 1.

$$\text{Index}=\{(+3)+(+4)\}\div 2=+3.5 \qquad \text{Expression 1}$$

Then, for example, in a case in which the threshold is "0," the timing determination unit 802 can determine that a present time is a timing appropriate for obtaining feedback since the calculated index of "+3.5" exceeds the threshold.

In the above-described example, the appropriate timing is determined on the basis of the two components, the user situation and the user feeling. However, the embodiment is not limited thereto. For example, the timing may be determined using at least one of the user situation and the user feeling.

Subsequently, referring back to FIG. 18, the acquisition control unit 803 of the feedback acquisition processing unit 80 performs a question sentence data generation process (step S282). Herein, the question sentence data generation process will be described in detail with reference to FIGS. 23 to 26. The acquisition control unit 803 according to the embodiment can adjust question sentence data for obtaining feedback in consideration of two components such as reliability that the user has ranked and, personality traits and habits of the user. All the reliability, the personality traits and habits are components of which a change is less than the user situation or the user feeling.

The reliability that the user has ranked is reliability of the system that the user has ranked, and the acquisition control unit 803 adjusts, for example, a formality degree (specifically, an expression or a way of speaking) of a question sentence in accordance with a level of the reliability. In addition, the acquisition control unit 803 can adjust the number of questions allowed by the user on the basis of the personality traits or habits (which is an example of an attribute) of the user. In the feedback acquisition process, feedback is desired to be obtained as much as possible from the user. However, when too many questions are asked, some users consider feeling unpleasant in some cases. Since a tolerance of the number of questions is considered to be caused by the personality traits or habits of the user, the number of questions may be adjusted, for example, using "factors for being happy" proposed in the field of happiness study in recent years. In "Mechanism of Happiness" (Kodansha's new library of knowledge) by a professor, Takashi Maeno, in a graduate school of Keio University, the following four factors are exemplified as "factors for being happy."

a factor "Let's have a try!" (a factor of self-fulfillment and growth)
a factor "Thank you!" (a factor of connection and thanks)
a factor "Going to be all right!" (a factor of positive stand and optimism)
a factor "Be yourself!" (a factor of independency and my pace)

Of these factors, the tolerance of the number of questions is considered to depend on a value of the factor "Let's have a try!" and the feedback acquisition processing unit 80 adjusts the number of questions in accordance with the magnitude of the value of the factor "Let's have a try!" of the user estimated on the basis of the personality traits or habits of the user. Note that the feedback acquisition processing unit 80 may adjust the number of questions in accordance with, for example, the positive degree (positiveness) of the personality traits of the user estimated on the basis of the personality traits or habits of the user without being limited to the factor "Let's have a try!."

Figure 23:
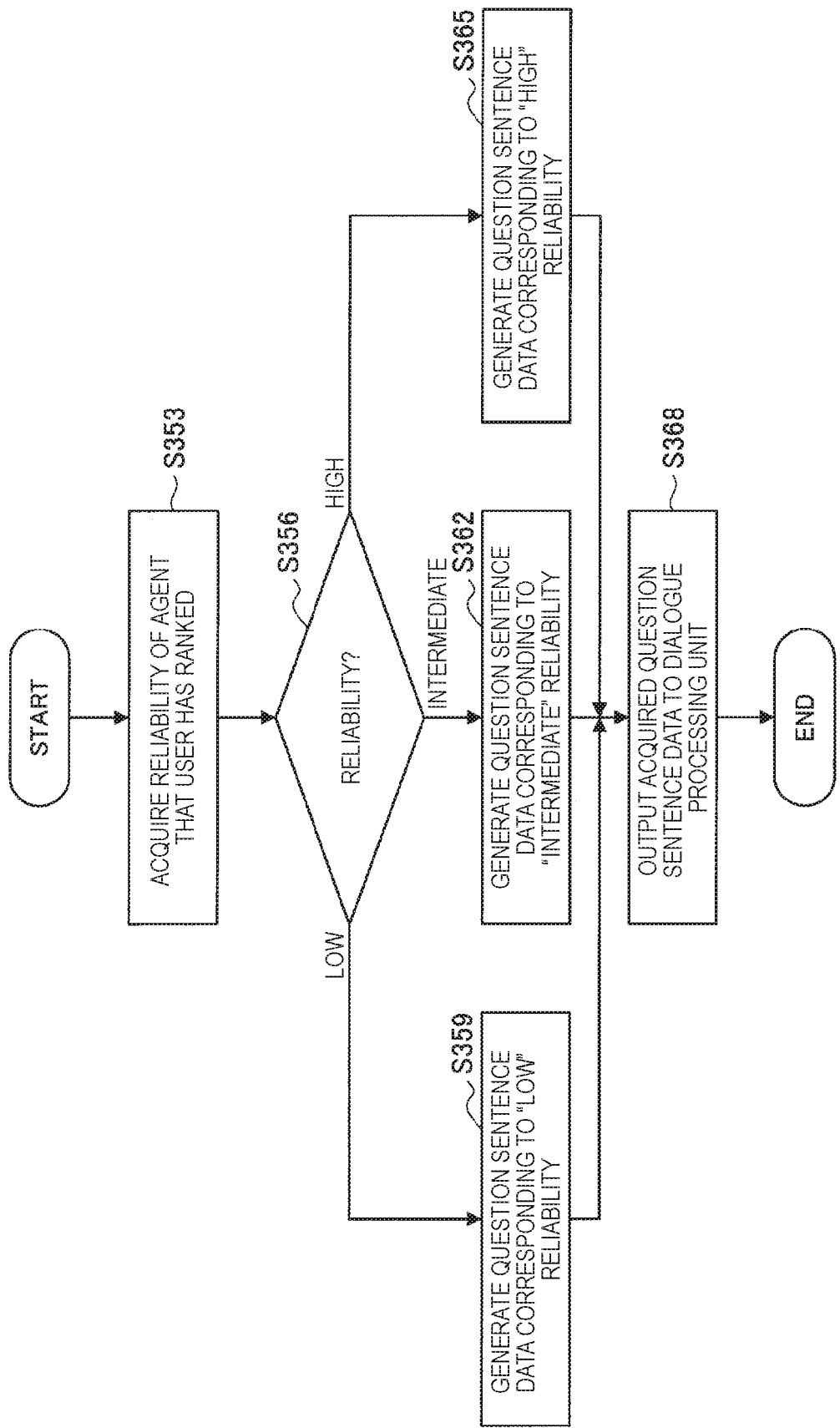
FIG. 23 is a flowchart illustrating a question sentence data generation process in which reliability is considered according to the embodiment.

FIG. 23 is a flowchart illustrating a question sentence data generation process in which reliability is considered according to the embodiment.

As illustrated in FIG. 23, the acquisition control unit 803 first acquires reliability of the system (the agent) that the user has ranked (step S353). The reliability of the agent that the user has ranked may be estimated on the basis of user information acquired from the user feeling DB 813 or may be acquired by directly asking the user a question. For example, the agent asks the user "How much do you trust me?" and reliability of the system is acquired from the user.

Subsequently, the acquisition control unit 803 adjusts an expression, a good way, and a request degree of feedback content of question sentence data stored in the question sentence DB 815 and corresponding to a mission in accordance with the level (high, intermediate, and low) of the reliability and generates question sentence data. That is, in a case in which the reliability is "low" ("low" in step S356), the acquisition control unit 803 generates the question sentence data corresponding to "low" reliability (step S359). In a case in which the reliability is "intermediate" ("intermediate" in step S356), the acquisition control unit 803 generates the question sentence data corresponding to "intermediate" reliability (step S362). In a case in which the reliability is "high" ("high" in step S356), the acquisition control unit 803 generates the question sentence data corresponding to "high" reliability (step S365). Specifically, in a case in which the reliability that the user has ranked is high, the acquisition control unit 803 adjusts the expression to a casual expression. In a case in which the reliability that the user has ranked is low, the acquisition control unit 803 adjusts the expression to a more formal expression. Herein, an example of the question sentence data adjusted in accordance with the reliability is illustrated in FIG. 24. As illustrated in FIG. 24, for example, question sentence data corresponding to a mission "obtaining feedback on the chocolate sample of BB company" is adjusted to a question sentence of a very formal expression "Could you please give me your feedback on the chocolate?" in a case in which the reliability is "low." In addition, the question sentence data is adjusted to a question sentence of a formal expression "Can you give me your feedback on the chocolate?" in a case in which the reliability is "intermediate." In addition, the question sentence data is adjusted to a question sentence of a casual expression "How was the chocolate?" in a case in which the reliability is "high." Further, when the reliability is "high," the request degree is high and the acquisition control unit 803 may generate question sentence data for asking a specific question "What do you like about it?" in response to an answer of the user, for example, "It is good."

Note that the example in which a specific exemplary sentence is generated with reference to the question sentence DB 815 has been described herein, but the embodiment is not limited thereto. The acquisition control unit 803 may output information regarding the reliability of the agent that the user has ranked to the dialogue processing unit 30 so that the dialogue processing unit 30 may generate question sentence data in accordance with the reliability. In addition, the acquisition control unit 803 may change a frequency at which the question for obtaining the feedback is performed in accordance with the level of the reliability. For example, in a case in which the reliability is low, the acquisition control unit 803 may reduce the frequency at which the question for obtaining the feedback is performed. As the reliability increases, the acquisition control unit 803 may increase the frequency at which the question for obtaining the feedback.

Then, the acquisition control unit 803 outputs the generated question sentence data to the dialogue processing unit 30 (step S368).

Next, a case in which the number of questions allowed by the user is adjusted on the basis of the personality traits and habits of the user will be described. There are many ways to indicate the personality traits of the user. Herein, for example, the factor "Let's have a try" included in "factors for being happy" introduced in "Mechanism of Happiness" (Kodansha's new library of knowledge) by a professor, Takashi Maeno, in a graduate school of Keio University is used. The factor "Let's have a try" is the factor of self-fulfillment and growth and a value of the factor has positive correlation with a level of happiness. The factor "Let's have a try" of the user is quantified between −1 to +1 on the basis of the personality traits and habits of the user and is recorded in advance in the individual characteristic DB 814. The tolerance of the number of questions for obtaining feedback is considered to depend on the level of happiness of the user and further the value of the factor "Let's have a try" and the acquisition control unit 803 adjusts the number of questions in accordance with the value of the factor "Let's have a try" of the user stored in the individual characteristic DB 814. In a case in which the number of questions is increased, the acquisition control unit 803 can generate question sentence data with reference to a sales point list corresponding to a mission stored in the question sentence DB 815.

Figure 25:
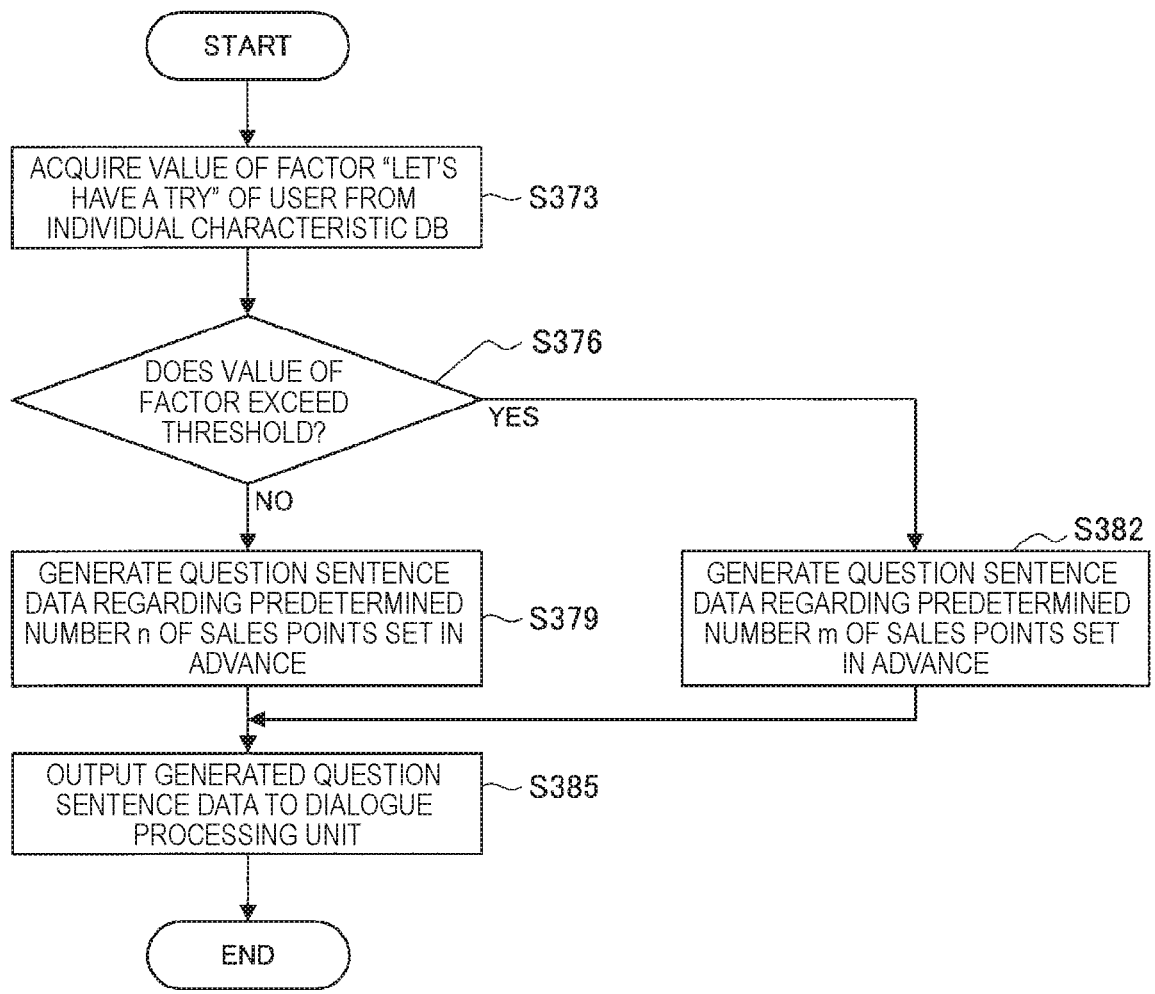
FIG. 25 is a flowchart illustrating a question sentence data generation process in which the personality traits of a user is considered according to the embodiment.

A process of adjusting the number of questions is illustrated in FIG. 25. FIG. 25 is a flowchart illustrating a question sentence data generation process in which personality traits of a user is considered according to the embodiment. As illustrated in FIG. 25, the acquisition control unit 803 first acquires the value of the factor "Let's have a try" of the user from the individual characteristic DB 814 (step S373).

Subsequently, the acquisition control unit 803 determines whether the value of the factor exceeds a predetermined threshold (step S376).

Subsequently, in a case in which the value of the factor does not exceed the predetermined threshold (No in step S376), the acquisition control unit 803 generates question sentence data regarding a predetermined number n of sales points set in advance (step S379).

Conversely, in a case in which the value of the factor exceeds the predetermined threshold (Yes in step S376), the acquisition control unit 803 generates question sentence data regarding a predetermined number m of sales points set in advance (step S382). Herein, the integers n and m have a relation of m>n. That is, in case in which the value of the factor "Let's have a try" exceeds the predetermined threshold, the acquisition control unit 803 adjusts the number of questions so that the number of questions is greater than in the case in which the value of the factor is less than the threshold since there is a high possibility of the user answering many questions because of his or her personality traits without feeling stress. Herein, an example of a sales point list of a mission stored in the question sentence DB 815 is illustrated in FIG. 26. The sales point list for each mission illustrated in FIG. 26 can be transmitted along with a request for feedback from an information processing device of a company side in advance and can be stored. For example, in the mission of "obtaining feedback on the chocolate sample of BB company," sales points "(1) smooth melt-in-the-mouth feeling," "(2) polyphenol content of 00%, good for health," "(3) low in calories" are registered. In a case in which the sales point (1) is asked to the user, for example, a question sentence "I heard that the chocolate provides good melt-in-the-mouth feeling. How was it?" is generated. In addition, in a case in which the sales point (2) is asked to the user, a question sentence "I heard that the chocolate is good for health because it contains 00% of polyphenol" is generated. In addition, in a case in which the sales point (3) is asked to the user, a question sentence "I heard that the chocolate is low in calories" is generated.

Then, the acquisition control unit 803 outputs the generated question sentence data to the dialogue processing unit 30 (step S385).

The question sentence generation process has been described specifically above.

Subsequently, referring back to FIG. 18, the feedback acquisition processing unit 80 outputs the generated question sentence data to the dialogue processing unit 30 (step S285).

Subsequently, the dialogue processing unit 30 performs a process of supplying the user with a dialogue of the agent into which the question sentence data output from the feedback acquisition processing unit 80 is inserted (step S288) and acquires the feedback (the question sentence data) of the user to the question (step S291). The presentation of the question sentence data is realized when the question sentence data is output to the voice agent I/F 20 along with the phoneme data in accordance with the agent ID designated by the user by the dialogue processing unit 30 and the question sentence data is vocalized by the voice agent I/F 20, and the vocalized question sentence data is transmitted to the client terminal 1. The user performs feedback on the specific experience in a format in which questions from the agent are answered. The client terminal 1 collects answer voice of the user with the microphone and transmits the answer voice to the agent server 2. At this time, the client terminal 1 also transmits various kinds of sensor information such as biological information and acceleration information detected from the user at the time of the feedback. Thus, the dialogue processing unit 30 of the agent server 2 can acquire not only an answer (verbal information) of the user but also non-verbal information such as a situation of voice (a situation in which voice is loud, a speaking amount abruptly increases, a tone of note, or the like), a situation of an activity amount (an amount of motion of a hand or a body or the like), or a body reaction (a heart rate, a respiration rate, a blood pressure, perspiration, or the like) as the feedback of the user.

Subsequently, the dialogue processing unit 30 outputs the acquired feedback to the feedback acquisition processing unit 80 (step S294).

Subsequently, the result generation unit 804 of the feedback acquisition processing unit 80 generates a result (report data) obtained by associating the acquired feedback with the mission (step S297) and outputs (transmits) the generated result to a company or the like of a request source (step S300).

Figure 27:
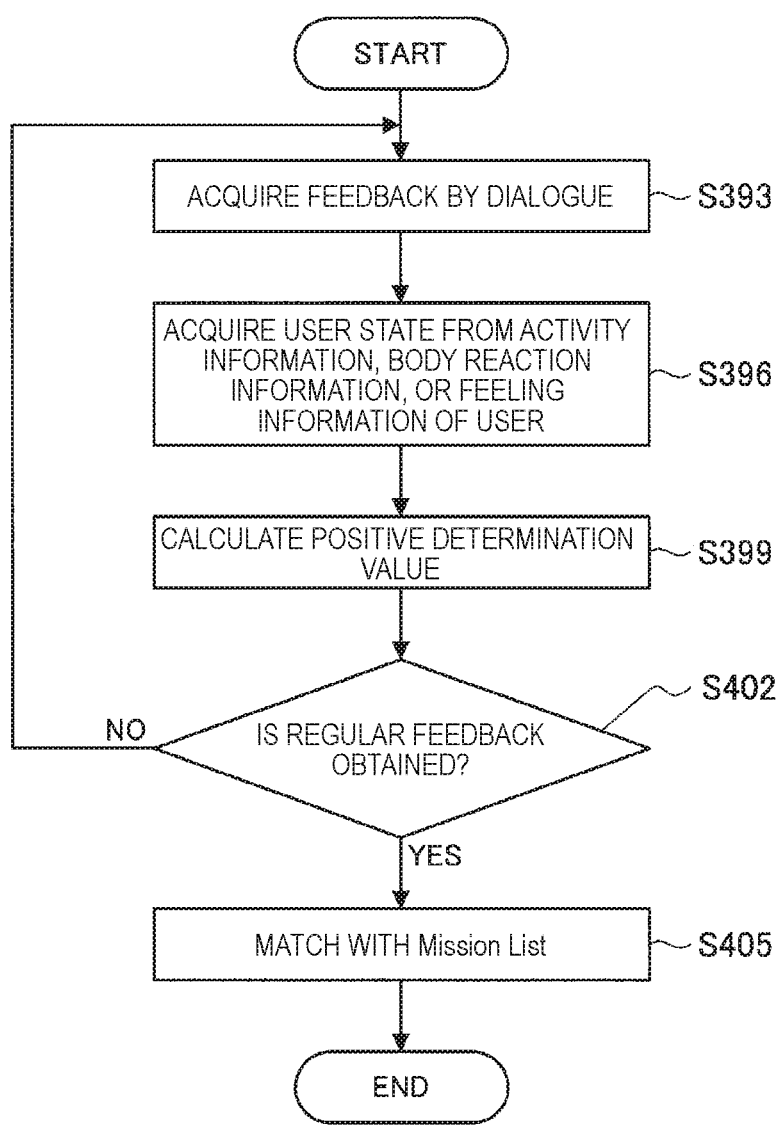
FIG. 27 is a flowchart illustrating a result generation process according to the embodiment.

Herein, the details of the result generation process described in the foregoing step S297 will be described with reference to FIGS. 27 and 28. FIG. 27 is a flowchart illustrating the result generation process according to the embodiment.

As illustrated in FIG. 27, the result generation unit 804 first acquires feedback (answer sentence data) acquired by a dialogue with the user from the dialogue processing unit 30 (step S393).

In addition, the result generation unit 804 acquires activity information (for example, a motion of the body) of the user at the time of feedback, body reaction information (for example, biological information), and feeling information (analyzed from the biological information or an expression of the face) from the user situation DB 812 or the user feeling DB 813 and estimates a user state (step S396). As described above, the feedback from the user includes not only the answer sentence data (verbal information) acquired from a conversation between the agent and the user performed through the dialogue processing unit 30 but also non-verbal information other than the answer sentence data. The non-verbal information is biological information detected by a biological sensor of a wearable terminal worn by the user, acceleration information detected by an acceleration sensor, a facial image of the user captured by a camera, feeling information, a context extracted from the conversation between the agent and the user, a voice analysis result of the conversation, or the like and is stored in the user situation DB 812 or the user feeling DB 813. The result generation unit 804 estimates a user state (busy, irritated, depressed, or the like) at the time of feedback on the basis of the information stored in the user situation DB 812 or the user feeling DB 813.

Subsequently, the result generation unit 804 calculates a positive determination value of the feedback on the basis of the verbal information and the non-verbal information of the feedback (step S399). Even when a good valuation can be obtain in an oral, a real intention appears in an attitude of the user or a tone of voice in some cases. Therefore, in the embodiment, a positive determination value of the user may be calculated on the basis of the non-verbal information other than an answer of the oral so that the positive determination value can be referred to along with the feedback result. For example, in a case in which each item of the non-verbal information can be considered to be a positive attitude, the positive determination value is normalized to 0 to 1 so that the positive determination result is near 1 and the average value is calculated as the positive determination value.

Subsequently, in a case in which a regular feedback (for example, the feedback regarding the sales points illustrated in FIG. 26, feedback on an experience of a mission target, or a predetermined number of feedbacks) is obtained (Yes in step S402), the result generation unit 804 matches the feedback result with the mission list and generates a result (step S405). Herein, an example of the generated result is illustrated in FIG. 28. As illustrated in FIG. 28, the feedback result according to the embodiment is associated with the mission, the sales point, the question sentence data, the feedback (the verbal language), the user state (the non-verbal information), and the positive determination value (calculated on the basis of the user state). Thus, the company side can understand not only the feedback (the answer sentence data) regarding each sales point but also the aspect of the user at that time from the user state or the positive determination value and can predict whether the user gives the feedback with his or her real intention.

Note that the feedback result is output to the advertisement insertion processing unit 70 so that the feedback result can be used even at the time of the advertisement insertion process in the advertisement insertion processing unit 70. That is, the advertisement insertion processing unit 70 according to the embodiment compares the content of the mission list with the advertisement DB 72, extracts terms (goods names, content names, company names, characteristics of goods/content (sales points), and the like) registered as words of interest in the advertisement DB 72, and refers to the feedback result including the words of interest. Specifically, the advertisement insertion processing unit 70 confirms the words of interest by which the user takes a positive attitude on the basis of the positive determination value of the feedback including the words of interest, and performs control such that advertisement information including the words of interest is inserted into a dialogue. Thus, it is possible to present the advertisement information to which the user positively reacts.

5. CONCLUSION

As described above, in the communication control system according to the embodiment of the present disclosure, it is possible to obtain reliable feedback from a user further naturally through a conversation with an agent without imposing a burden on the user.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it is possible to also generate a computer program causing hardware such as the CPU, the ROM, and the RAM contained in the client terminal 1 or the agent server 2 described above to realize the function of the client terminal 1 or the agent server 2. In addition, a computer-readable storage medium that stores the computer program is also provided.

In addition, in the above-described embodiment, the configuration in which various functions are realized by the agent server 2 on the Internet has been described, but the embodiment is not limited thereto. At least a part of the configuration of the agent server 2 illustrated in FIG. 3 may be realized in the client terminal 1 (a smartphone, a wearable terminal, or the like) of the user. In addition, the whole configuration of the agent server 2 illustrated in FIG. 3 may be installed in the client terminal 1 so that the client terminal 1 can perform all the processes.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A communication system including:

a communication unit configured to receive request information for requesting feedback on a specific experience of a user;

an accumulation unit configured to accumulate the feedback received from a client terminal of the user via the communication unit; and a control unit configured to perform control such that a question for requesting the feedback on the specific experience of the user based on the request information is transmitted to the client terminal of the user at a timing according to context of the user, and feedback input by the user in response to the question output as speech of an agent via the client terminal is received.

(2)

The communication system according to (1), in which after it is estimated that the user has the specific experience, the control unit performs control such that the question for requesting the feedback on the specific experience of the user is transmitted to the client terminal of the user.

(3)

The communication system according to (2), in which the control unit estimates that the user has the specific experience by acquiring a response of the user to a question regarding whether the user has the specific experience, via the communication unit.

(4)

The communication system according to (2), in which the control unit estimates that the user has the specific experience by acquiring an analysis result of sensor data of the client terminal via the communication unit.

(5)

The communication system according to any one of (1) to (4), in which the control unit performs control such that the question for requesting the feedback is transmitted to the client terminal at a timing according to at least one of a schedule of the user, a conversation of the user acquired via the communication unit, and feeling information of the user which are the context of the user.

(6)

The communication system according to any one of (1) to (5), in which the control unit generates the question for requesting the feedback in consideration of a relation between the user and the agent.

(7)

The communication system according to (6), in which the control unit generates the question by using, as the relation, reliability of the agent that the user has ranked.

(8)

The communication system according to (7), in which the control unit adjusts an expression of the question for requesting the feedback in accordance with the reliability.

(9)

The communication system according to any one of (1) to (8), in which the control unit generates the question for requesting the feedback in consideration of an attribute of the user.

(10)

The communication system according to (9), in which the attribute of the user is a personality trait or habit of the user.

(11)

The communication system according to (10), in which the control unit generates a predetermined number of questions for requesting the feedback, in accordance with the attribute of the user.

(12)

The communication system according to any one of (1) to (11), in which the control unit calculates a positive determination value of the specific experience on a basis of the feedback and a feeling of the user at the time of acquisition of the feedback, and accumulates the positive determination value of the specific experience in the accumulation unit.

(13)

The communication system according to any one of (1) to (12), in which the control unit performs control such that the question for requesting the feedback is output, in voive, as speech of the agent from the client terminal by using voice corresponding to a specific agent.

(14)

The communication system according to (13), further including:

a database configured to store voice data corresponding to each agent, in which the control unit performs control such that the question for requesting the feedback is generated in consideration of a personality trait of an agent purchased by the user, and the generated question is output in voice from the client terminal by using voice corresponding to the agent.

(15)

The communication system according to any one of (1) to (14), in which the accumulation unit stores the request information in association with feedback transmitted from the client terminal via the communication unit.

(16)

A communication control method including: by a processor, receiving request information for requesting feedback on a specific experience of a user via a communication unit;

performing control such that a question for requesting the feedback on the specific experience of the user based on the request information is transmitted to a client terminal of the user at a timing according to context of the user, and feedback input by the user in response to the question output as speech of an agent via the client terminal is received; and accumulating the feedback received from the client terminal of the user via the communication unit, in the accumulation unit.

REFERENCE SIGNS LIST 1 client terminal
2 agent server
30 dialogue processing unit
300 dialogue processing unit
310 question sentence retrieval unit
320 answer sentence generation unit
330 conversation DB
340 phoneme data acquisition unit
31 basic dialogue processing unit
32 character A dialogue processing unit
33 person B dialogue processing unit
34 person C dialogue processing unit
40 phoneme storage unit
41 basic phoneme DB
42 character A phoneme DB
43 person B phoneme DB
44 person C phoneme DB
5 conversation DB generation unit
60 phoneme DB generation unit
70 advertisement insertion processing unit
72 advertisement DB
80 feedback acquisition processing unit
801 list confirmation unit
802 timing determination unit
803 acquisition control unit
804 result generation unit
810 mission list DB
811 experience list DB
812 user situation DB
813 user feeling DB
814 individual characteristic DB
815 question sentence DB
3 network
10 agent

The invention claimed is:

1. A communication system, comprising:
a processor configured to:
receive request information to request a feedback on a specific experience related to one of an object, a content, or a service from a user;
determine, based on the received request information, one of a sum or an average value of a first timing index and a second timing index, wherein
the first timing index is associated with a schedule of the user,
the second timing index is associated with a feeling of the user, and
the feeling of the user corresponds to one of a busy state, an irritated state, a depressed state, a relaxed state, a focused state, or a tense state;
determine, based on the one of the sum or the average value exceeds a threshold, a timing for transmission of a first question to request the feedback on the specific experience to a client terminal of the user;
modify an expression of the first question based on reliability of an agent of the communication system, wherein the reliability of the agent corresponds to a rank assigned to the agent by the user;
generate a modified first question based on the modified expression of the first question;
control the transmission of the modified first question to the client terminal of the user at the determined timing, wherein the modified first question is associated with speech of the agent;
control reception of the feedback of the user from the client terminal based on to the modified first question; and
accumulate the feedback received from the client terminal in a database.

2. The communication system according to claim 1, wherein the processor is further configured to:

estimate that the user has the specific experience; and control the transmission of the modified first question to the client terminal based on the estimation.

3. The communication system according to claim 2, wherein the processor is further configured to:

acquire a response of the user based on transmission of a second question to the client terminal, wherein the second question is associated with the specific experience of the user; and estimate that the user has the specific experience based on the acquired response.

4. The communication system according to claim 2, wherein the processor is further configured to:

acquire an analysis result of sensor data of the client terminal; and estimate that the user has the specific experience based on the acquired analysis result.

5. The communication system according to claim 1, wherein the processor is further configured to estimate the feeling of the user based on a context of a conversation between the user and the agent.

6. The communication system according to claim 1, wherein the processor is further configured to generate the modified first question based on an attribute of the user.

7. The communication system according to claim 6, wherein the attribute of the user is one of a personality trait or habit of the user, and the attribute is associated with one of biological information of the user, voice information of the user, a captured image acquired from a wearable terminal worn by the user, or a conversation between the user and the agent.

8. The communication system according to claim 7, wherein the processor is further configured to generate, based on the attribute of the user, a specific number of questions to request the feedback.

9. The communication system according to claim 1, wherein the processor is further configured to:

calculate a positive determination value of the specific experience based on the feedback and the feeling of the user, the positive determination value is calculated at a time of acquisition of the feedback, and accumulate the positive determination value of the specific experience in the database.

10. The communication system according to claim 9, wherein the processor is further configured to:

estimate user state information at the time of acquisition of the feedback, wherein the user state information is estimated based on activity information of the user, body reaction information of the user, and the feeling of the user, and calculate the positive determination value of the specific experience based on the feedback and the estimated user state information.

11. The communication system according to claim 1, wherein the processor is further configured to control output of the modified first question based on a voice corresponding to the agent.

12. The communication system according to claim 11, wherein the database is configured to store voice data corresponding to the agent, and the processor is further configured to control generation of the modified first question based on a personality trait of the agent.

13. The communication system according to claim 1, wherein the processor is further configured to store the request information in association with the feedback transmitted from the client terminal.

14. The communication system according to claim 1, wherein the communication system further comprises the database, the database is further configured to store a plurality of data sets to request the feedback, and the plurality of data sets includes specific pairs of question sentence data and answer sentence data.

15. The communication system according to claim 1, wherein the speech of the agent is associated with a plurality of prosodic models and a plurality of phoneme segments, and the plurality of prosodic models and the plurality of phoneme segments are stored in the database.

16. A communication control method, comprising:

in a communication control system:

receiving request information for requesting a feedback on a specific experience related to one of an object, a content, or a service from a user;

determining, based on the received request information, one of a sum or an average value of a first timing index and a second timing index, wherein the first timing index is associated with a schedule of the user, the second timing index associated with a feeling of the user, and the feeling of the user corresponds to one of a busy state, an irritated state, a depressed state, a relaxed state, a focused state, or a tense state;

determining, based on the one of the sum or the average value exceeds a threshold, a timing for transmission of a question to request the feedback on the specific experience to a client terminal of the user;

modifying an expression of the question based on reliability of an agent of the communication control system, wherein the reliability of the agent corresponds to a rank assigned to the agent by the user;

generating a modified question based on the modified expression of the question;

controlling the transmission of the modified question to the client terminal of the user at the determined timing, wherein the modified question is associated with speech of the agent;

controlling reception of the feedback of the user from the client terminal based on the modified question; and accumulating the feedback received from the client terminal in a database.

* * * * *